(12) United States Patent
Karaki et al.

(10) Patent No.: US 11,139,925 B2
(45) Date of Patent: Oct. 5, 2021

(54) HARQ FEEDBACK FOR UNSCHEDULED UPLINK

(71) Applicant: TELEFONAKTIEBOLAGET LM ERICSSON (PUBL), Stockholm (SE)

(72) Inventors: Reem Karaki, Aachen (DE); Jung-Fu Cheng, Fremont, CA (US); Amitav Mukherjee, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/343,993

(22) PCT Filed: Oct. 19, 2017

(86) PCT No.: PCT/IB2017/056520
§ 371 (c)(1),
(2) Date: Apr. 22, 2019

(87) PCT Pub. No.: WO2018/073792
PCT Pub. Date: Apr. 26, 2018

(65) Prior Publication Data
US 2019/0342037 A1    Nov. 7, 2019

Related U.S. Application Data

(60) Provisional application No. 62/411,189, filed on Oct. 21, 2016.

(51) Int. Cl.
*H04L 1/18* (2006.01)
*H04L 1/16* (2006.01)
(Continued)

(52) U.S. Cl.
CPC .......... *H04L 1/1819* (2013.01); *H04L 1/1614* (2013.01); *H04L 5/0055* (2013.01);
(Continued)

(58) Field of Classification Search
CPC .... H04L 1/1861; H04L 5/0055; H04W 72/04; H04W 72/1263; H04W 72/1278
See application file for complete search history.

(56) References Cited

U.S. PATENT DOCUMENTS

| 2009/0285163 A1* | 11/2009 | Zhang | ............. H04L 1/0045 370/329 |
| 2016/0192396 A1 | 6/2016 | Ng | |

(Continued)

FOREIGN PATENT DOCUMENTS

| CN | 102474400 B | 10/2014 |
| CN | 104901775 B | 12/2018 |

(Continued)

OTHER PUBLICATIONS

3GPP TS 36321, V12.1.0, "3rd Generation Partnership Project; Technical Specification Group Radio Access Network; Evolved Universal Terrestrial Radio Access (E-UTRA); Medium Access Control (MAC) protocol specification (Release 12)", Mar. 2014.

(Continued)

*Primary Examiner* — Raj Jain

(57) ABSTRACT

A network node (14) communicates with a wireless device (12) to provide Hybrid Automatic Repeat Request (HARQ) feedback for autonomous uplink transmissions in an unlicensed spectrum. The network node receives a plurality of autonomous uplink transmissions from the wireless device in the unlicensed spectrum, and transmits HARQ feedback for the plurality of autonomous uplink transmissions to the wireless device, the HARQ feedback comprising a bit map of some or all HARQ processes configured for at least one cell (16) and a corresponding bit acknowledgement mapped to each HARQ process.

23 Claims, 19 Drawing Sheets

LBT in Wi-Fi

(51) Int. Cl.
*H04L 5/00* (2006.01)
*H04W 16/14* (2009.01)
*H04W 72/04* (2009.01)
*H04W 74/08* (2009.01)
*H04W 72/12* (2009.01)

(52) U.S. Cl.
CPC ........... *H04W 16/14* (2013.01); *H04W 72/04* (2013.01); *H04W 72/042* (2013.01); *H04W 72/1263* (2013.01); *H04W 74/0808* (2013.01)

(56) References Cited

U.S. PATENT DOCUMENTS

| | | | |
|---|---|---|---|
| 2016/0226630 A1* | 8/2016 | Zhang | H04L 1/1861 |
| 2017/0111925 A1 | 4/2017 | Nigam et al. | |
| 2017/0367058 A1* | 12/2017 | Pelletier | H04W 52/246 |
| 2018/0278373 A1* | 9/2018 | Wang | H04L 1/1812 |
| 2019/0159253 A1* | 5/2019 | Koorapaty | H04W 74/0808 |
| 2019/0215867 A1* | 7/2019 | Cheng | H04W 24/10 |
| 2019/0342037 A1* | 11/2019 | Karaki | H04W 16/14 |

FOREIGN PATENT DOCUMENTS

| | | |
|---|---|---|
| CN | 105450368 B | 7/2019 |
| CN | 105991248 B | 2/2020 |
| EP | 1119955 A1 | 8/2001 |
| WO | 00/21262 | 4/2000 |
| WO | 2011/002218 A2 | 1/2011 |
| WO | 2015/199469 A1 | 12/2015 |
| WO | 2016/144244 A1 | 9/2016 |

OTHER PUBLICATIONS

ETSI TS 136 211, V12.3.0, "LTE; Evolved Universal Terrestrial Radio Access (E-UTRA); Physical channels and modulation (3GPP TS 36.211 version 12.3.0 Release 12)", Oct. 2014.

ETSI TS 136 212, V12.6.0, "LTE; Evolved Universal Terrestrial Radio Access (E-UTRA); Multiplexing and channel coding (3GPP TS 36.212 version 12.6.0 Release 12)", Oct. 2015.

ETSI TS 136 213, V12.3.0, "LTE; Evolved Universal Terrestrial Radio Access (E-UTRA); Physical layer procedures (3GPP TS 36.213 version 12.3.0 Release 12)", Oct. 2014.

Lenovo, "Discussion on retransmission design for grant-free based UL transmission", 3GPP TSG RAN WG1 Meeting #86bis, R1-1609400, Lisbon, Portugal Oct. 10-14, 2016.

Nokia et al., "eLAA UL scheduling/UL grant details", 3GPP TSG RAN WG1 Meeting #85, R1-164941, Nanjing, China, May 23-27, 2016.

Nokia et al., "UCI transmission on LAA SCells", 3GPP TSG-RAN WG2 Meeting #85, R1-164920, Nanjing, China, May 23-27, 2016.

\* cited by examiner

LTE Downlink Physical Resource

LTE Time Domain Structure

Downlink Subframe

Uplink Subframe

LBT in Wi-Fi

LBT in EN 301.893

LAA to Unlicensed Spectrum Using LTE Carrier Aggregation

MSF PHICH HARQ ACK/NACK

New DL Control Transmission Region Based on Shortened UL Subframes

New DL Control Transmission Region Based on
Timing Advance of the UL Transmissions

HARQ FEEDBACK FOR UNSCHEDULED UPLINK

CROSS-REFERENCE TO RELATED APPLICATIONS

This application is national phase of PCT Patent Application No. PCT/IB32017/056520, filed Oct. 19, 2017, which claims the benefit of U.S. Provisional Application No. 62/411,189 filed on Oct. 21, 2016, the subject matter of which are hereby incorporated by reference in their entirety.

TECHNICAL FIELD

The disclosed subject matter relates generally to telecommunications. Certain embodiments relate more particularly to concepts such as License Assisted Access (LAA), unscheduled Long Term Evolution (LTE) uplink transmissions, and LTE/Wi-Fi coexistence.

BACKGROUND

The Third Generation Partnership Project (3GPP) work on License Assisted Access (LAA) intends to allow Long Term Evolution (LTE) equipment to also operate in unlicensed radio spectrum. Candidate bands for LTE operation in unlicensed spectrum include 5 gigahertz (GHz), 3.5 GHz, etc. Unlicensed spectrum is used as a complement to licensed spectrum or allows completely standalone operation.

When unlicensed spectrum is used as a complement to licensed spectrum, devices typically connect in licensed spectrum (e.g. a Primary Cell (PCell)) and use Carrier Aggregation (CA) to benefit from additional transmission capacity in unlicensed spectrum (e.g. a Secondary Cell (SCell)). The CA framework allows aggregation of two or more carriers with the condition that at least one carrier (or frequency channel) is in licensed spectrum and at least one carrier is in unlicensed spectrum. In a standalone (or completely unlicensed spectrum) mode of operation, one or more carriers are selected solely in unlicensed spectrum.

Regulatory requirements, however, may not permit transmissions in unlicensed spectrum without prior channel sensing, transmission power limitations, or imposed maximum channel occupancy time. Because unlicensed spectrum must be shared with other radios of similar or dissimilar wireless technologies, a so called Listen-Before-Talk (LBT) method can be used to facilitate effective sharing. LBT typically involves sensing a medium for a predefined minimum amount of time and backing off if the channel is busy. Due to centralized coordination and dependency of terminal devices on the base station (enhanced or evolved Node B (eNB)) for channel access in LTE operation and imposed LBT regulations, LTE uplink performance is especially hampered. Uplink transmission is becoming more and more important with user-centric applications and the need for pushing data to the cloud.

Today, the unlicensed 5 GHz spectrum is mainly used by equipment implementing the IEEE 802.11 Wireless Local Area Network (WLAN) standard. This standard is known under its marketing brand "Wi-Fi" and allows completely standalone operation in unlicensed spectrum. Unlike the case in LTE, Wi-Fi terminals can asynchronously access the medium and thus show better uplink performance characteristics especially in congested network conditions.

LTE uses Orthogonal Frequency Division Multiplexing (OFDM) in the downlink and Discrete Fourier Transform (DFT) spread OFDM (also referred to as Single-Carrier Frequency Division Multiple Access (SC-FDMA)) in the uplink. A basic LTE downlink physical resource can thus be seen as a time-frequency grid as illustrated in Figure (FIG. 1, where each resource element corresponds to one OFDM subcarrier during one OFDM symbol interval. An uplink subframe has the same subcarrier spacing as the downlink and the same number of SC-FDMA symbols in the time domain as OFDM symbols in the downlink.

In the time domain, LTE downlink transmissions are organized into radio frames of 10 milliseconds (ms), with each radio frame comprising ten equally-sized subframes of length $T_{SUBFRAME}=1$ ms as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 microseconds (μs).

Furthermore, resource allocation in LTE is typically described in terms of Resource Blocks (RBs), where a RB corresponds to one slot (0.5 ms) in the time domain and 12 contiguous subcarriers in the frequency domain. A pair of two adjacent RBs in the time direction (1.0 ms) is known as a RB pair. RBs are numbered in the frequency domain, starting with 0 from one end of the system bandwidth.

Downlink transmissions are dynamically scheduled, i.e., in each subframe the base station transmits control information about which terminals data is transmitted to and upon which RBs the data is transmitted, in the current downlink subframe. This control signaling is typically transmitted in the first 1, 2, 3, or 4 OFDM symbols in each subframe and the number n=1, 2, 3, or 4 is known as the Control Format Indicator (CFI). The downlink subframe also contains common reference symbols, which are known to the receiver and used for coherent demodulation of, e.g., the control information. A downlink system with CFI=3 OFDM symbols as control is illustrated in FIG. 3. The reference symbols shown in FIG. 3 are the Cell specific Reference Symbols (CRSs) and are used to support multiple functions including fine time and frequency synchronization and channel estimation for certain transmission modes.

Uplink transmissions are dynamically scheduled, i.e., in each downlink subframe the base station transmits control information about which terminals should transmit data to the eNB in subsequent subframes, and upon which RBs the data is transmitted. The uplink resource grid is comprised of data and uplink control information in the Physical Uplink Shared Channel (PUSCH), uplink control information in the Physical Uplink Control Channel (PUCCH), and various reference signals such as Demodulation Reference Signals (DMRSs) and Sounding Reference Signals (SRSs).

DMRSs are used for coherent demodulation of PUSCH and PUCCH data, whereas SRS is not associated with any data or control information but is generally used to estimate the uplink channel quality for purposes of frequency-selective scheduling. An example uplink subframe is shown in FIG. 4. Note that uplink DMRS and SRS are time-multiplexed into the uplink subframe, and SRSs are always transmitted in the last symbol of a normal uplink subframe. The PUSCH DMRS is transmitted once every slot for subframes with normal cyclic prefix, and is located in the fourth and eleventh SC-FDMA symbols.

From LTE Release (Rel.) 11 onwards, downlink or uplink resource assignments can also be scheduled on the enhanced Physical Downlink Control Channel (EPDCCH). For Rel-8 to Rel-10 only the Physical Downlink Control Channel (PDCCH) is available. Resource grants are User Equipment device (UE) specific and are indicated by scrambling the Downlink Control Information (DCI) Cyclic Redundancy Check (CRC) with the UE-specific Cell Radio Network Temporary Identifier (C-RNTI) identifier. A unique C-RNTI is assigned by a cell to every UE associated with it, and can take values in the range 0001-FFF3 in hexadecimal format. A UE uses the same C-RNTI on all serving cells.

In LTE, uplink access is typically controlled by the eNB, i.e., scheduled. In this case the UE would report to the eNB when data is available to be transmitted, e.g., by sending a Scheduling Request (SR) message. Based on this, the eNB would grant the resources and relevant information to the UE in order to carry out the transmission of a certain size of data. The assigned resources are not necessarily sufficient for the UE to transmit all the available data. Therefore, it is possible that the UE sends a Buffer Status Report (BSR) control message in the granted resources in order to inform the eNB about the correct size and updated size of the data waiting for transmission. Based on that, the eNB would further grant the resources to carry on with the UE uplink transmission of the corrected size of data.

In more detail, every time new data arrives at a UE's empty buffer, the following procedure is performed:
1. Using PUCCH, the UE informs the network that it needs to transmit data by sending a SR indicating that it needs uplink access. The UE has periodic timeslots for SR transmissions (typically on a 5, 10, or 20 ms interval).
2. Once the eNB receives the SR request bit, it responds with a small "uplink grant" that is just large enough to communicate the size of the pending buffer. The reaction to this request typically takes 3 ms.
3. After the UE receives and processes (takes about 3 ms) its first uplink grant, it typically sends a BSR that is a Medium Access Control (MAC) Control Element (CE) used to provide information about the amount of pending data in the uplink buffer of the UE. If the grant is big enough, the UE sends data from its buffer within this transmission as well. Whether the BSR is sent depends also on conditions specified in 3GPP Technical Specification (TS) 36.321 Version 12.1.0.
4. The eNB receives the BSR message, allocates the necessary uplink resources, and sends back another uplink grant that will allow the device to drain its buffer.

Adding it all up, about 16 ms (plus time to wait for PUCCH transmission opportunity) of delay can be expected between data arrival at the empty buffer in the UE and reception of this data in the eNB.

In case the UE is not Radio Resource Control (RRC) connected in LTE or lost its uplink synchronization since it did not transmit or receive anything for a certain time, the UE would use the random access procedure to connect to the network, obtain synchronization and also send the SR. If this is the case the procedure until the data can be sent would take even longer than the SR transmission on PUCCH.

In the LTE system, transmission formats and parameters are controlled by the eNB, typically through DCI. Such DCI typically contains:
Resources allocated for uplink transmission (including whether frequency hopping is applied)
Modulation and Coding Scheme (MCS)
Redundancy versions
New data indicator
Transmit power control command
Information about DMRS
In case of cross-carrier scheduling, the target carrier index is also included
Other applicable control information on uplink transmissions The DCI is first protected by 16-bit CRC. The CRC bits are further scrambled by the UE assigned identity (C-RNTI). The DCI and scrambled CRC bits are further protected by convolutional coding. The encoded bits are transmitted from the eNB to UE using either PDCCH or EPDCCH.

For Frequency Division Duplexing (FDD), asynchronous HARQ is used for downlink. This means that the eight HARQ processes can be used in any order. Nevertheless, the eNB sends (Process Identity (ID), Redundancy Version (RV)) in PDCCH so the UE can know which HARQ process it received during a certain subframe.

For Frequency Division Duplexing (FDD), synchronous HARQ is used for uplink. The UE should use the same HARQ process number every eight subframes. Because a specific HARQ process ID is used at specific subframe, the receiver (eNB) knows which HARQ process comes when. An eNB can also know about RV because the uplink grant (DCI 0) from the eNB can specify RV using the MCS field. It has two modes of operation: adaptive and non-adaptive HARQ. With adaptive, the UE does not care about "HARQ feedback (Physical HARQ Indicator Channel (PHICH))," it retransmits based on DCI 0 information. While non-adaptive retransmission follows a HARQ feedback (PHICH=Negative Acknowledgment (NACK)) without a DCI 0 and the UE retransmits using the same DCI (RB, MCS, etc.) as the initial transmission.

For Time Division Duplexing (TDD), one uplink subframe acknowledgment of multiple downlink transport blocks is supported since some TDD configurations contain an unequal number of downlink/uplink subframes. The PUCCH design for TDD is different than FDD, because for TDD it is required to carry multiple acknowledgements per UE. An alternative mechanism that allows for reuse of the FDD PUCCH design is also provided in LTE TDD, whereby the acknowledgments corresponding to multiple downlink transmissions are grouped using a logical "AND" operation to form a single acknowledgment whether zero or more than zero blocks were received in error. However, this requires retransmission of all the HARQ processes if at least one of them is NACKed.

In typical deployments of WLAN, Carrier Sense Multiple Access with Collision Avoidance (CSMA/CA) is used for medium access. This means that the channel is sensed to perform a Clear Channel Assessment (CCA), and a transmission is initiated only if the channel is declared as Idle. In case the channel is declared as Busy, the transmission is essentially deferred until the channel is deemed to be Idle.

A general illustration of the LBT mechanism of Wi-Fi is shown in FIG. 5. After a Wi-Fi station A transmits a data frame to a station B, station B shall transmit the Acknowledgement (ACK) frame back to station A with a delay of 16 µs. Such an ACK frame is transmitted by station B without performing a LBT operation. To prevent another station interfering with such an ACK frame transmission, a station shall defer for a duration of 34 µs (referred to as Distributed Inter-Frame Space (DIFS)) after the channel is observed to be occupied before assessing again whether the channel is occupied. Therefore, a station that wishes to transmit first performs a CCA by sensing the medium for a fixed duration DIFS. If the medium is idle then the station assumes that it may take ownership of the medium and begin a frame exchange sequence. If the medium is busy, the station waits for the medium to go idle, defers for DIFS, and waits for a further random backoff period.

In the above basic protocol, when the medium becomes available, multiple Wi-Fi stations may be ready to transmit, which can result in collision. To reduce collisions, stations intending to transmit select a random backoff counter and defer for that number of slot channel idle times. The random backoff counter is selected as a random integer drawn from a uniform distribution over the interval of [0, CW]. The default size of the random backoff contention window (CW), CWmin, is set in the IEEE specifications. Note that collisions can still happen even under this random backoff protocol when there are many stations contending for the channel access. Hence, to avoid recurring collisions, the backoff CW is doubled whenever the station detects a collision of its transmission up to a limit, CWmax, also set in the IEEE specifications. When a station succeeds in a transmission without collision, it resets its random backoff CW size back to the default value, CWmin.

For a device not utilizing the Wi-Fi protocol, EN 301.893, V1.7.1 provides the following requirements and minimum behavior for the load-based CCA:

1. Before a transmission or a burst of transmissions on an Operating Channel, the equipment shall perform a CCA check using "energy detect." The equipment shall observe the Operating Channel(s) for the duration of the CCA observation time which shall be not less than 20 μs. The CCA observation time used by the equipment shall be declared by the manufacturer. The Operating Channel shall be considered occupied if the energy level in the channel exceeds the threshold corresponding to the power level given in point 5 below. If the equipment finds the channel to be clear, it may transmit immediately (see point 3 below).
2. If the equipment finds an Operating Channel occupied, it shall not transmit in that channel. The equipment shall perform an Extended CCA check in which the Operating Channel is observed for the duration of a random factor N multiplied by the CCA observation time. N defines the number of clear idle slots resulting in a total Idle Period that needs to be observed before initiation of the transmission. The value of N shall be randomly selected in the range 1 . . . q every time an Extended CCA is required and the value stored in a counter. The value of q is selected by the manufacturer in the range 4 . . . 32. This selected value shall be declared by the manufacturer (see clause 5.3.1 q)). The counter is decremented every time a CCA slot is considered to be "unoccupied." When the counter reaches zero, the equipment may transmit.
3. The total time that an equipment makes use of an Operating Channel is the Maximum Channel Occupancy Time which shall be less than (13/32)×q ms, with q as defined in point 2 above, after which the device shall perform the Extended CCA described in point 2 above.
4. The equipment, upon correct reception of a packet which was intended for this equipment, can skip CCA and immediately (see note 4), proceeds with the transmission of management and control frames (e.g., ACK and Block ACK frames). A consecutive sequence of transmissions by the equipment, without it performing a new CCA, shall not exceed the Maximum Channel Occupancy Time as defined in point 3 above.

NOTE 4: For the purpose of multi-cast, the ACK transmissions (associated with the same data packet) of the individual devices are allowed to take place in a sequence.

5. The energy detection threshold for the CCA shall be proportional to the maximum transmit power (PH) of the transmitter: for a 23 decibel-milliwatt (dBm) Equivalent Isotropically Radiated Power (EIRP) transmitter, the CCA threshold level (n) shall be equal or lower than −73 dBm/megahertz (MHz) at the input to the receiver (assuming a 0 dB isotropic (dBi) receive antenna). For other transmit power levels, the CCA threshold level TL shall be calculated using the formula: TL=−73 dBm/MHz+23−PH (assuming a 0 dBi receive antenna and PH specified in dBm EIRP).

An example to illustrate the EN 301.893 LBT is provided in FIG. 6.

Up to now, the spectrum used by LTE is dedicated to LTE. This has the potential benefit that the LTE system generally does not need to care about the coexistence issue and the spectrum efficiency can be maximized. However, the spectrum allocated to LTE is limited which cannot meet the ever increasing demand for larger throughput from applications/services. Therefore, Rel-13 LAA extended LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize unlicensed spectrum reliably is to transmit essential control signals and channels on a licensed carrier. That is, as shown in FIG. 7, a UE is connected to a PCell in the licensed band and one or more SCells in the unlicensed band. In the present disclosure a SCell in unlicensed spectrum is denoted as a LAA SCell. In the case of standalone operation as in MulteFire (MF), no licensed cell is available for uplink control signal transmissions.

In the LAA study item asynchronous HARQ is recommended for LAA uplink (PUSCH). That means uplink retransmissions may not only occur one Round Trip Time (RTT) (e.g., n+8) after the initial transmission but rather at any point in time. This is considered beneficial in particular when retransmissions are blocked and postponed due to LBT. When introducing asynchronous HARQ, the UE should therefore assume that all transmitted uplink HARQ processes were successful (set local status to ACK). The UE performs a HARQ retransmission for a HARQ process only upon reception of a corresponding uplink Grant (New Data Indicator (NDI) not toggled) from the eNB.

In MulteFire, the following concepts are applicable for Downlink HARQ. After reception of the PDCCH/EPDCCH and associated PDSCH in subframe 'n,' the UE shall have the associated HARQ feedback ready for transmission in subframe 'n+4.' The UE shall transmit any pending HARQ feedback at the earliest possible uplink transmission opportunity following the 'n+4' constraint. The uplink transmission opportunity is defined according to either MF short PUCCH (sPUCCH) or MF enhanced PUCCH (EPUCCH) resources being available for the UE. When transmitting the HARQ feedback associated to the PDSCH, the UE shall collect pending feedback. The pending HARQ feedback may potentially include feedback for several downlink transmissions. The pending HARQ feedback is collected in a bitmap with an implicit association between the index in the bitmap and the HARQ process ID. The size of this bitmap is configurable by the eNB. The maximum number of HARQ processes for downlink operation is 16. When signaled in MF-ePUCCH/sPUCCH bitmap, the default status of a HARQ-ID packet is NACK unless there is an ACK available to be sent.

For MulteFire, the following concepts apply for Uplink HARQ. MF inherits asynchronous uplink HARQ operation as introduced in LTE Rel-13 for enhanced Machine Type Communication (eMTC). There is no support for non-adaptive HARQ operation, and the UE shall ignore any information content on the PHICH resources with respect to HARQ operation. The PHICH resources are maintained as part of the downlink transmission resources, but the information content is reserved for future use. Any uplink transmission (new transmission or retransmission) is scheduled through the uplink grant through PDCCH/EPDCCH.

For LTE uplink channel access, both the UE and the eNB need to perform LBT operations corresponding to the SR, scheduling grant, and data transmission phases. In contrast, Wi-Fi terminals only need to perform LBT once in the uplink data transmission phase. Moreover, Wi-Fi terminals can asynchronously send data compared to the synchronized LTE system. Thus, Wi-Fi terminals have a natural advantage over LTE terminals in uplink data transmission, and show superior performance in collocated deployment scenarios as seen in our simulation studies. Overall study results show that Wi-Fi has a better uplink performance than LTE particularly in low-load or less congested network conditions. As the network congestion or load is increased, the LTE channel access mechanism (Time Division Multiple Access (TDMA) type) becomes more efficient, but Wi-Fi uplink performance is still superior. In U.S. Provisional Patent Application Ser. No. 62/326,292, filed Apr. 22, 2016 and U.S. Provisional Patent Application Ser. No. 62/301,010, filed Feb. 29, 2016, both of which are hereby incorporated by reference, two different uplink concepts for LTE/LAA/MF are proposed to increase the flexibility and the performance of uplink. In 62/326,292, similar to Wi-Fi behavior, a UE can start the uplink transmission without waiting for permission from the eNB. In other words, a UE can perform LBT to gain uplink channel access whenever the uplink data arrives without transmitting a SR or having an uplink grant from the eNB. The UE can use the unscheduled mode for the whole data transmission or, alternatively, transmit using unscheduled mode for first N transmission bursts and then switches back to the eNB controlled scheduling mode. In 62/301,010, Semi-Persistent Scheduling (SPS) grants with granted periodicity down to 1 ms are proposed to achieve similar behavior as autonomous uplink. With periodicity of 1 ms, a UE can attempt to transmit every subframe for the whole granted period.

SUMMARY

In certain embodiments of the disclosed subject matter, methods and apparatuses are provided for communicating HARQ control information for unscheduled uplink transmissions. Among other things, these methods and apparatuses may relate to issues such as (a) how to send/indicate the HARQ feedback to the UE, (b) when to send the HARQ feedback to the UE, and (c) How to request the HARQ feedback from the eNB.

Certain embodiments are presented in recognition of shortcomings associated with conventional approaches, such as the following examples. In scheduled access, uplink access is enhanced or evolved Node B (eNB) controlled. The eNB grants certain subframes for uplink transmission. The User Equipment device (UE) can then attempt to access the channel for the time for which the grant is valid. The eNB expects uplink transmission only within those subframes. It tries to decode the Physical Uplink Shared Channel (PUSCH) of the granted uplink subframe and based on the decoding result of the PUSCH, the eNB should convey an Acknowledgement (ACK) or Negative Acknowledgement (NACK) to the UE.

The situation will not be as straightforward in unscheduled mode. In unscheduled mode, the eNB does not know when to expect the uplink transmission. If the eNB identifies an autonomous uplink transmission, it can send the corresponding acknowledgement to the UE. However, if the eNB missed the uplink transmission from the UE, the UE will not get any feedback for the corresponding Hybrid Automatic Repeat Request (HARQ) process. Thereby, the UE will not reuse the HARQ process. New HARQ feedback operation should be considered to avoid the latter situation.

Certain embodiments may provide various benefits compared to conventional approaches, such as the following examples. Various alternative embodiments may provide efficient HARQ feedback design for unscheduled uplink transmissions, exploit the benefits of shared Maximum Channel Occupancy Time (MCOT) concept to deliver HARQ feedback to the UE, and/or guarantee (implicit or explicit) reception of HARQ feedback for all processes even for the transmissions that were missed by the eNB.

In some embodiments of the disclosed subject matter, a method is provided for operating a network node in a cellular communications network to provide Hybrid Automatic Repeat Request (HARQ) feedback for autonomous uplink transmissions in an unlicensed spectrum. The method comprises receiving a plurality of autonomous uplink transmissions from a wireless device in the unlicensed spectrum, and transmitting HARQ feedback for the plurality of autonomous uplink transmissions to the wireless device, the HARQ feedback comprising a bit map of some or all HARQ processes configured for at least one cell and a corresponding bit acknowledgement mapped to each HARQ process.

In certain related embodiments, transmitting the HARQ feedback comprises transmitting the HARQ feedback via physical downlink control channel (PDCCH) or extended PDCCH (EPDCCH).

In certain related embodiments, the method further comprises determining that the network node has failed to decode data of one or more autonomous uplink transmissions from the wireless device, and in response to the determination, requesting retransmission of the data via downlink control information (DCI).

In certain related embodiments, the method further comprises receiving an indication of a remaining duration of a maximum channel occupancy time (MCOT) from the wireless device, and in response to receiving the indication, transmitting information to the wireless device during the remaining duration.

In certain related embodiments, transmitting the HARQ feedback comprises transmitting the HARQ feedback using a format selected from a group consisting of a format based on physical downlink control channel (PDCCH) or extended PDCCH (EPDCCH), a format comprising a physical layer channel using one interlace for multiple signals, a format comprising a physical layer channel using one interlace for multiple signals in a downlink partial subframe, a format based on Physical HARQ Indicator Channel (PHICH), a format based on PHICH in combination with bit compression to reduce a size of the bitmap, and a format based on an implicit ACK/NACK via Control Channel Element (CCE) indices of PDCCH transmissions sent to wireless devices for downlink scheduling where a time gap between an autonomous uplink transmission and a PDCCH transmission is 1 ms or more.

In certain related embodiments, for each HARQ process of the some or all HARQ processes, the corresponding bit acknowledgement indicates a NACK if the network node (14) missed an autonomous uplink transmission from the wireless device (12) on the HARQ process, or the network node (14) failed to successfully decode an autonomous uplink transmission from the wireless device (12) on the HARQ process.

In certain related embodiments, the method further comprises, if the network node (14) identifies an autonomous uplink transmission from the wireless device (12) and fails to successfully decode the identified autonomous uplink transmission, performing at least one of transmitting a request for retransmission using a dedicated uplink grant via PDCCH OR EPDCCH, transmitting a NACK via common PDCCH (CPDCCH), and transmitting a NACK via PHICH.

In certain related embodiments, the method further comprises transmitting the HARQ feedback using a shared maximum channel occupancy time scheme in which a portion of a maximum channel occupancy time for an uplink transmission from the wireless device (12) is used for transmission by the network node. In some such embodiments, the method further comprises transmitting the HARQ feedback starting at an earliest subframe boundary within the shared maximum channel occupancy time after completion of the uplink transmission and performing a fast Listen Before Talk (LBT) procedure. In some other such embodiments, the shared maximum channel occupancy time scheme utilizes a shortened uplink transmission time interval (TTI) within a subframe to enable transmission of the HARQ feedback in a remainder of the subframe. In still other such embodiments, the shared maximum channel occupancy time scheme utilizes a timing advance for the uplink transmission such that a downlink channel in which the HARQ feedback is transmitted before a start of a next downlink subframe after completion of the uplink transmission.

In certain related embodiments, transmitting the HARQ feedback comprises multiplexing the HARQ feedback with a planned downlink transmission.

In certain related embodiments, transmitting the HARQ feedback comprises triggering a downlink transmission to transmit the HARQ feedback if a HARQ feedback has been pending for at least a predefined or preconfigured threshold amount of time.

In certain related embodiments, the wireless device (12) is restricted from reusing a HARQ process before receiving HARQ feedback for the HARQ process from the network node (14).

In some embodiments of the disclosed subject matter, a network node comprises at least one processor (36), memory (38) and transceiver (42) collectively configured to perform a method as described above.

In some embodiments of the disclosed subject matter, a method is provided for operating a wireless device (12) in a cellular communications network (10) enabled to transmit autonomous uplink transmissions in an unlicensed spectrum. The method comprises performing autonomous uplink transmissions in the unlicensed spectrum for one or more HARQ processes, and receiving HARQ feedback from a network node (14), the HARQ feedback comprising a bit map of some or all HARQ processes configured for at least one respective cell (16) and a corresponding bit acknowledgement mapped to each HARQ process.

In certain related embodiments, the method further comprises, in response to determining that no HARQ feedback for a predetermined autonomous uplink transmission is received from the network node within a predetermined time period, retransmitting the predetermined autonomous uplink transmission.

In certain related embodiments, the method further comprises using a timer to determine a number of subframes since an initial transmission of the predetermined autonomous uplink transmission, and performing the retransmission in response to the timer exceeding a configured threshold.

In certain related embodiments, the method further comprises determining a remaining duration of a maximum channel occupancy time (MCOT) of the wireless device, transmitting an indication of a remaining duration of the MCOT to the network node, and receiving information from the network node during the remaining duration.

In certain related embodiments, receiving the HARQ feedback comprises receiving the HARQ feedback via physical downlink control channel (PDCCH) or extended PDCCH (EPDCCH).

In certain related embodiments, the method further comprises transmitting an autonomous uplink transmission to the network node, and receiving, from the network node via downlink control information (DCI), a request for retransmission of the autonomous uplink transmission.

In certain related embodiments, receiving the HARQ feedback comprises transmitting the HARQ feedback using a format selected from a group consisting of a format based on physical downlink control channel (PDCCH) or extended PDCCH (EPDCCH), a format comprising a physical layer channel using one interlace for multiple signals, a format comprising a physical layer channel using one interlace for multiple signals in a downlink partial subframe, a format based on Physical HARQ Indicator Channel (PHICH), a format based on PHICH in combination with bit compression to reduce a size of the bitmap, and a format based on an implicit ACK/NACK via Control Channel Element (CCE) indices of PDCCH transmissions sent to wireless devices for downlink scheduling where a time gap between an autonomous uplink transmission and a PDCCH transmission is 1 ms or more.

In certain related embodiments, for each HARQ process of the some or all HARQ processes, the corresponding bit acknowledgement indicates a NACK if the network node (14) missed an autonomous uplink transmission from the wireless device (12) on the HARQ process, or the network node (14) failed to successfully decode an autonomous uplink transmission from the wireless device (12) on the HARQ process.

In certain related embodiments, the method further comprises receiving the HARQ feedback using a shared maximum channel occupancy time scheme in which a portion of a maximum channel occupancy time for an uplink transmission from the wireless device (12) is used for transmission by the network node.

In certain related embodiments, the method further comprises receiving the HARQ feedback starting at an earliest subframe boundary within the shared maximum channel occupancy time after completion of the uplink transmission.

In certain related embodiments, the shared maximum channel occupancy time scheme utilizes a shortened uplink transmission time interval (TTI) within a subframe to enable transmission of the HARQ feedback in a remainder of the subframe.

In certain related embodiments, the shared maximum channel occupancy time scheme utilizes a timing advance for the uplink transmission such that a downlink channel in which the HARQ feedback is received before a start of a next downlink subframe after completion of the uplink transmission.

In certain related embodiments, transmitting the HARQ feedback comprises multiplexing the HARQ feedback with a planned downlink transmission.

In some embodiments of the disclosed subject matter, a wireless device comprises at least one processor (20), memory (22) and transceiver (24) collectively configured to perform a method as described above.

BRIEF DESCRIPTION OF THE DRAWINGS

The drawings illustrate selected embodiments of the disclosed subject matter. In the drawings like reference labels indicate like features.

FIG. 16 illustrates another example embodiment of a network node and, in particular, a radio access node (e.g., a base station).

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

As used herein, a "radio node" is either a radio access node or a wireless device. As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node. As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like. As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device. As used herein, a "network node" is any node that is either part of the radio access network or the CN of a cellular communications network/system.

Portions of this description relate to 3GPP cellular communications system and, as such, 3GPP LTE terminology or terminology similar to 3GPP LTE terminology is oftentimes used; however, the concepts disclosed herein are not limited to LTE or a 3GPP system. Additionally, portions of this description may describe certain concepts in relation to a "cell"; however, these concepts could alternatively be applied in other contexts. For instance, with respect to Fifth Generation (5G) concepts, beams may be used instead of cells and, as such, it is important to note that the concepts described herein are equally applicable to both cells and beams.

Figure 1:
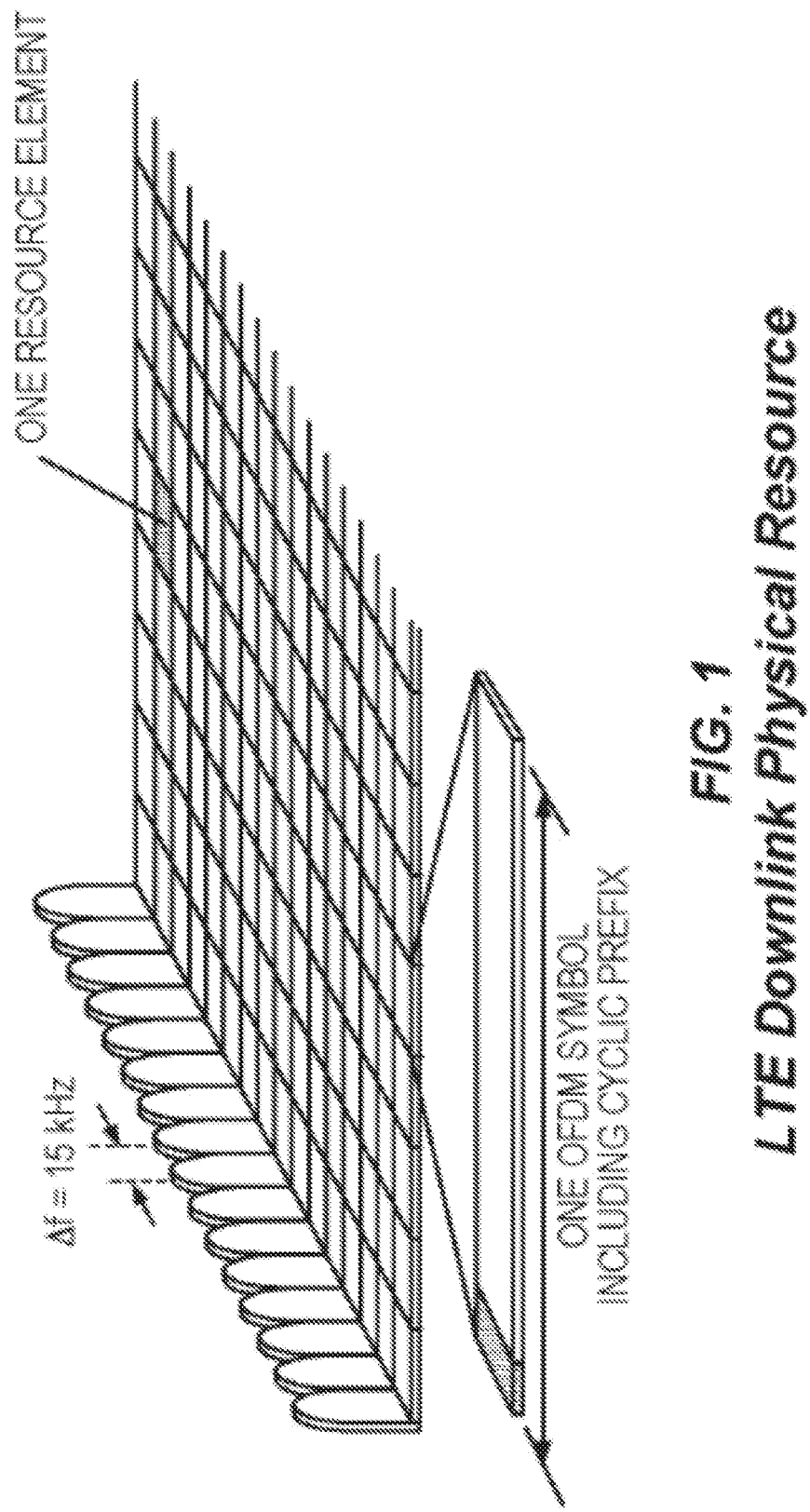
FIG. 1 illustrates a time-frequency grid that depicts the basic Long Term Evolution (LTE) downlink physical resource.
Figure 2:
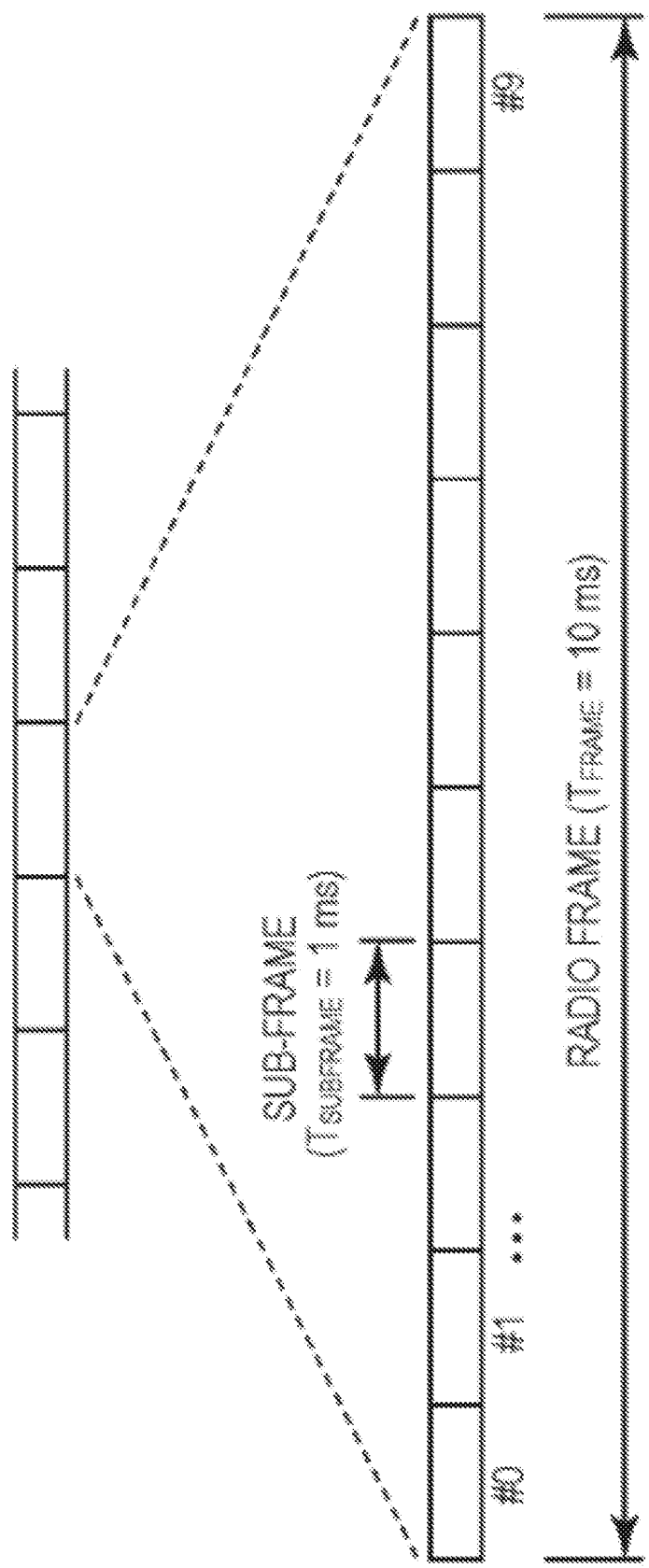
FIG. 2 illustrates the LTE downlink frame structure.
Figure 3:
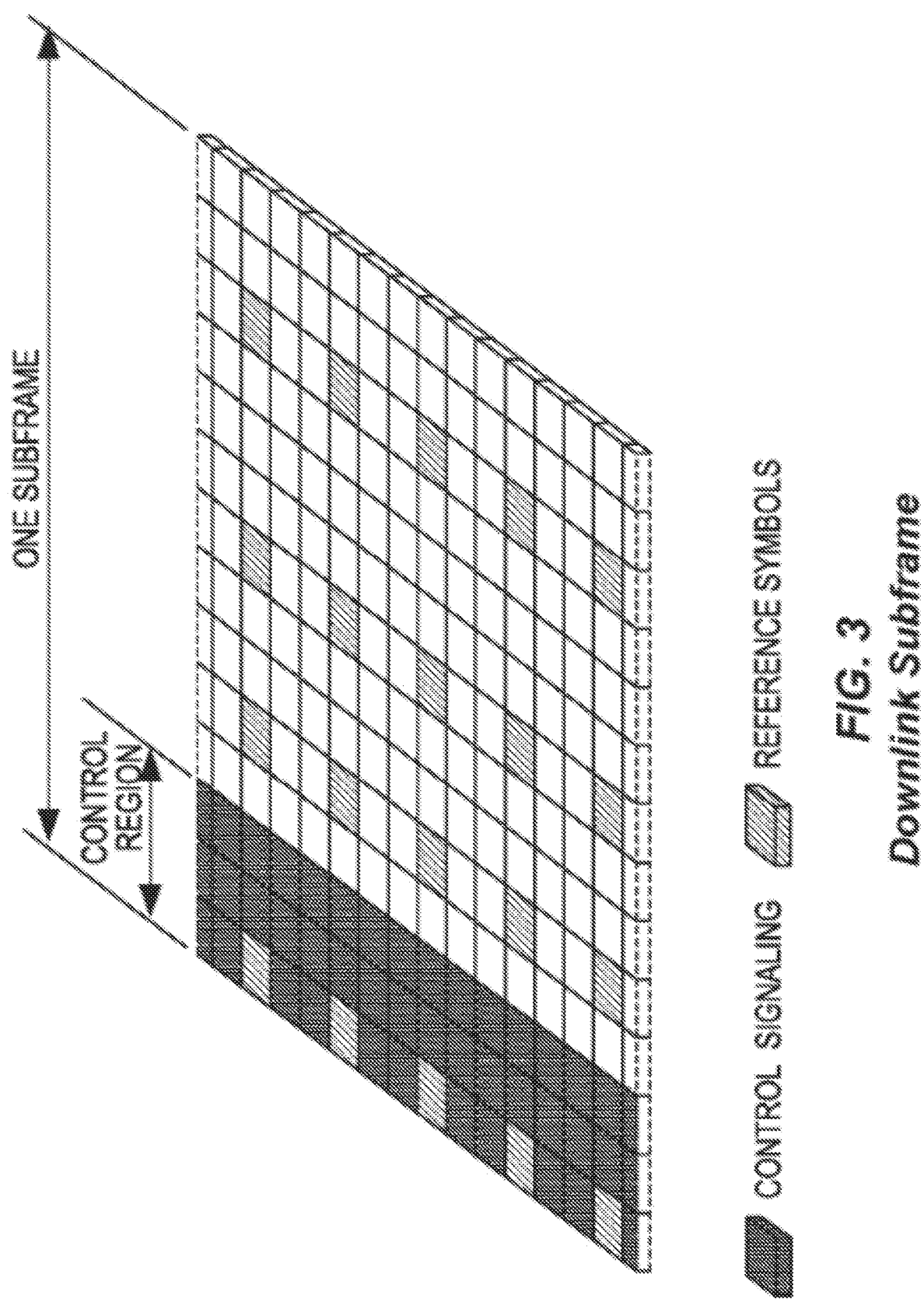
FIG. 3 illustrates an LTE downlink subframe with Control Format Indicator (CFI)=3.
Figure 4:
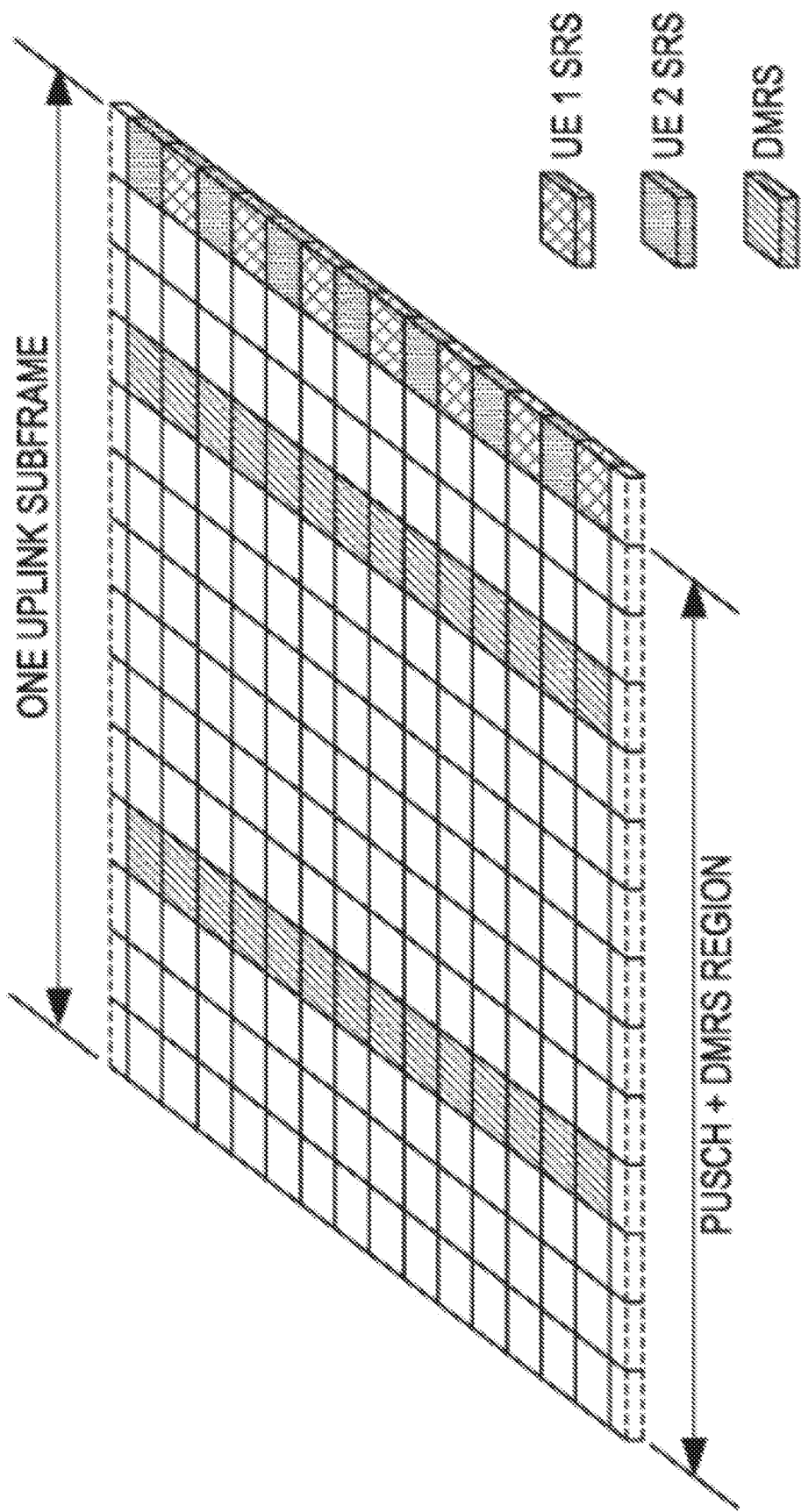
FIG. 4 illustrates an LTE uplink subframe.
Figure 5:
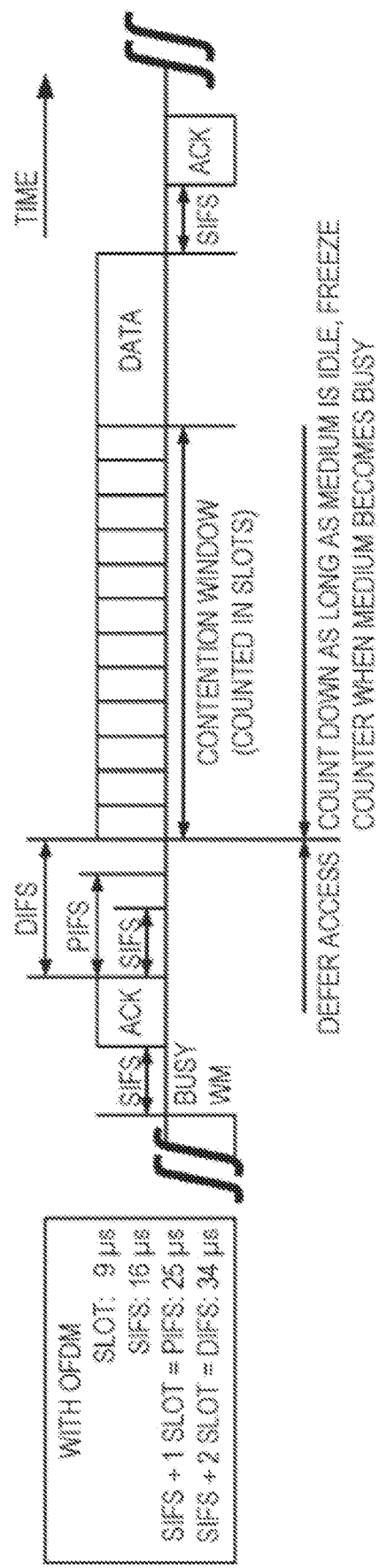
FIG. 5 illustrates the Listen-Before-Talk (LBT) mechanism of Wi-Fi.
Figure 6:
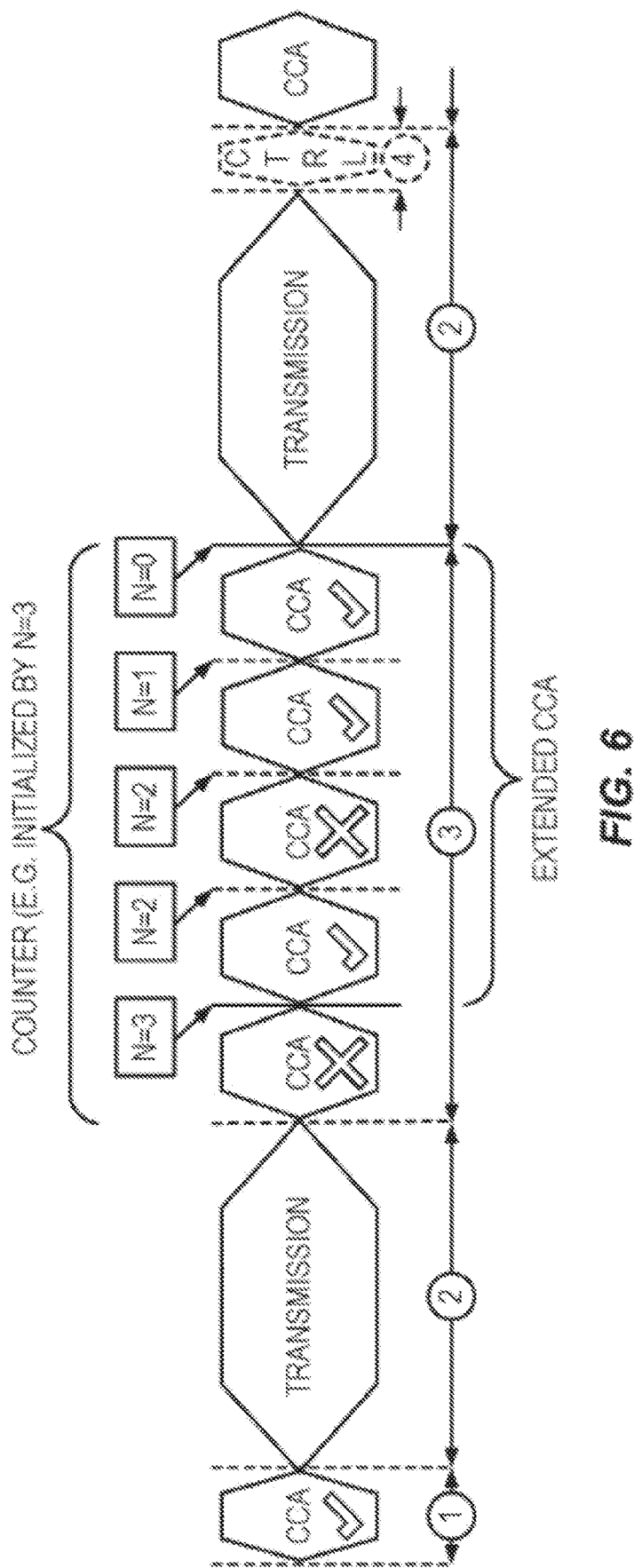
FIG. 6 illustrates the EN 301.893 LBT scheme.
Figure 7:
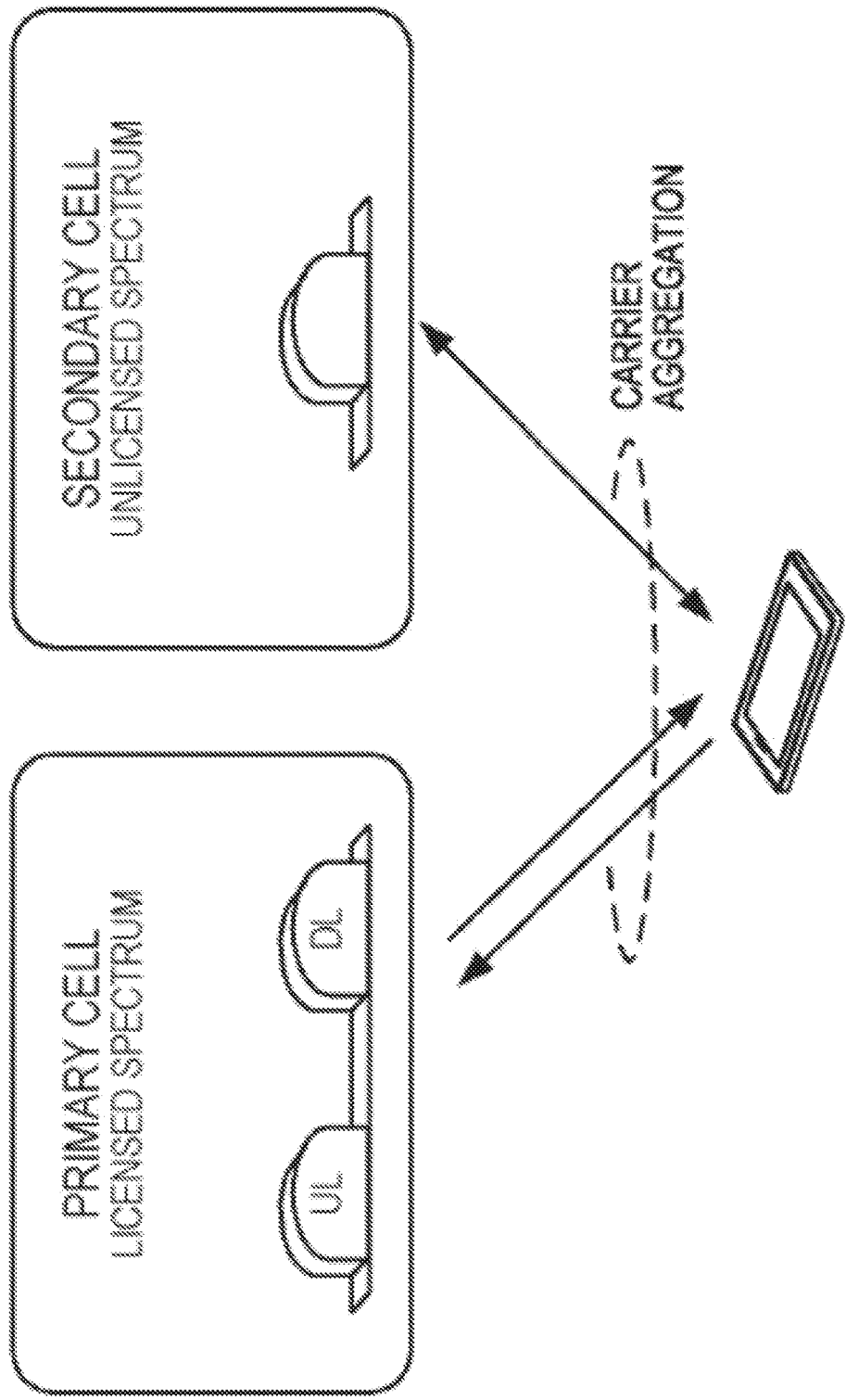
FIG. 7 illustrates License Assisted Access (LAA) to unlicensed spectrum using LTE Carrier Aggregation (CA).
Figure 8:
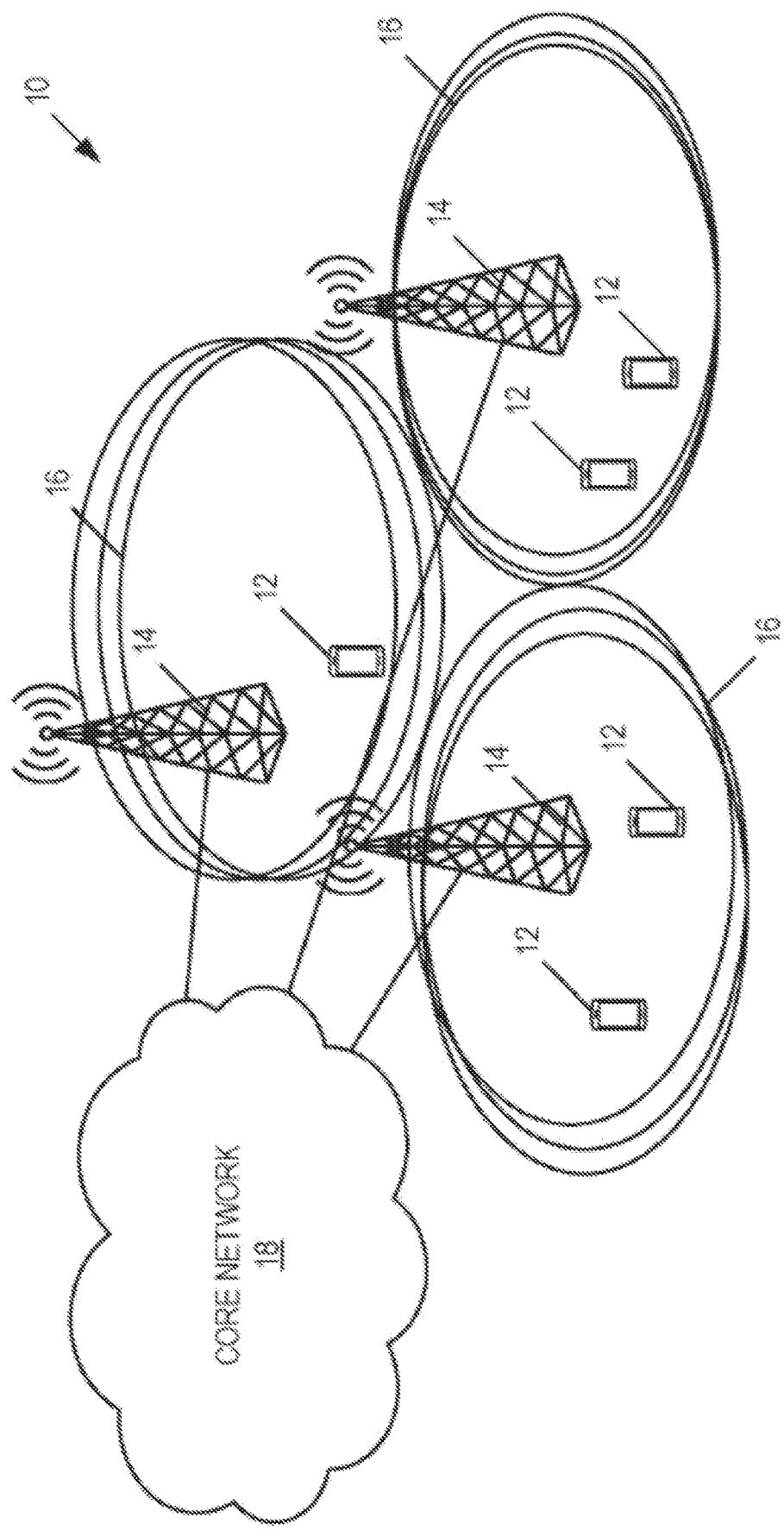
FIG. 8 illustrates one example of a cellular communications network in which embodiments of the disclosed subject matter may be implemented.

FIG. 8 illustrates one example of a cellular communications network 10, or more generally a wireless system, in which certain embodiments of the disclosed subject matter may be implemented. As illustrated, a number of UEs 12, or more generally wireless devices, wirelessly transmit signals to and receive signals from base stations 14 (e.g., eNBs), or more generally radio access nodes, each serving one or more cells 16. Base stations 14 are sometimes referred to herein as eNBs 14. Base stations 14 are connected to a core network 18. Base stations 14 each serve one or more cells 16. In some embodiments, the cells 16 include cells 16 operating in licensed spectrum as well as cells 16 operating in unlicensed spectrum. For example, for License Assisted Access (LAA), a base station 14 may serve one or more cells 16 in licensed spectrum and one or more cells 16 in unlicensed spectrum, where, for a particular UE 12, one of the cells 16 is configured as the Primary Cell (PCell) of UE 12, one or more other cells 16 in licensed spectrum may be configured as Secondary Cells (SCells) of UE 12, and one or more of the cells 16 in unlicensed spectrum may be configured as an SCell of UE 12. In some other embodiments, the cells 16 operate in unlicensed spectrum. For example, for LTE in unlicensed spectrum (LTE-U) and similar technologies such as MulteFire (MF), both the PCell and any SCells of UE 12 operate in unlicensed spectrum.

A number of embodiments are described below. Unless otherwise stated or required, any one or more of these embodiments can be combined.

Figure 9:
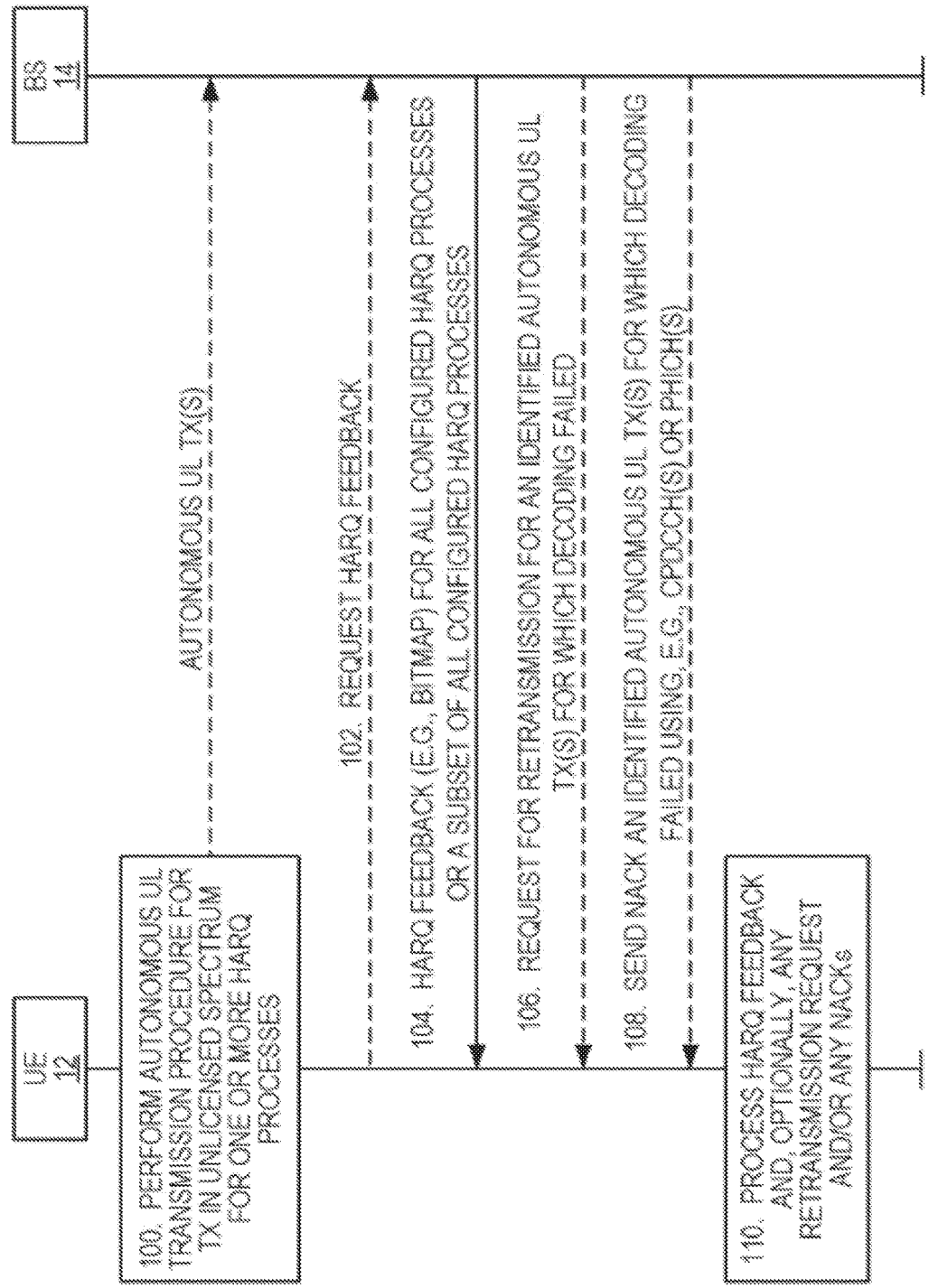
FIG. 9 illustrates the operation of a wireless device and a base station according to some embodiments of the disclosed subject matter.

Before describing various specific embodiments, FIG. 9 illustrates the operation of the cellular communications network 10 of FIG. 8 according to some embodiments of the disclosed subject matter. As illustrated, UE 12 performs an autonomous uplink transmission procedure for transmitting in an unlicensed spectrum for one or more HARQ processes (step 100). For example, UE 12 may determine that there is uplink data in its uplink buffer waiting for transmission. In response, rather than performing the conventional uplink transmission scheme that requires a Scheduling Request (SR) and an uplink grant, UE 12 performs a Listen-Before-Talk (LBT) procedure and, if the channel is determined to be clear, autonomously decides to begin transmitting on the channel in unlicensed spectrum. Note that this autonomous behavior of UE 12 is configured by base station 14, in some embodiments. Each transmission (i.e., each transmission in a Transmit Time Interval (TTI)) is associated with a respective HARQ process. In some embodiments, UE 12 cannot reuse a HARQ process for another transmission until UE 12 receives HARQ feedback for the HARQ process from base station 14. For example, if UE 12 receives an Acknowledgement (ACK) for the HARQ process, then that HARQ process can then be reused for a new transmission. However, if UE 12 receives a Negative Acknowledgement (NACK) for the HARQ process, then UE 12 performs a retransmission for that HARQ process according to the HARQ scheme.

Optionally (as indicated by the dashed line), in some embodiments, UE 12 requests HARQ feedback (step 102) (see, e.g., the "fifth embodiment" described below).

In this embodiment, base station 14 transmits HARQ feedback to UE 12 for all HARQ processes or some subset of the HARQ processes configured for the cell (step 104), as discussed in more detail below with respect to the "first embodiment." As discussed below, in some embodiments, the HARQ feedback is provided as a bitmap of some or all uplink HARQ processes configured on the respective cell and a corresponding bit acknowledgment mapped to each HARQ process. In some embodiments, the bitmap encompasses the uplink HARQ processes configured on multiple uplink cells.

The HARQ feedback may be transmitted in various formats (see, e.g., the "first embodiment" below). Also, various different techniques may be used when transmitting the HARQ feedback (see, e.g., the "third embodiment" and the "fourth embodiment" described below).

In some embodiments, in addition to sending the bitmap, if base station 14 identifies an autonomous uplink transmission but fails to decode the data, base station 14 either requests a retransmission (step 106) or sends a NACK (step 108) (see, e.g., the "second embodiment" described below).

UE 12 processes the HARQ feedback and, optionally, any retransmission requests or NACKs (step 110). For example, UE 12 processes the HARQ feedback to determine whether to perform any retransmissions for the respective HARQ processes.

First Embodiment

To reduce the delays for autonomous uplink it is more beneficial to use uplink asynchronous HARQ protocol in particular when retransmissions are blocked and postponed due to LBT. However, UE 12 is restricted not to reuse the HARQ process before getting the feedback from the eNB 14. UE 12 stays in "waiting" state until it receives the HARQ feedback. The eNB 14 sends HARQ feedback to UE 12 after it has received a number of autonomous uplink transmissions.

The HARQ feedback consists of a bitmap of some or all the uplink HARQ processes configured on that cell and a corresponding bit acknowledgement mapped to each process (for instance: 0 to indicate NACK, 1 to indicate ACK). The bitmap may also encompass the uplink HARQ processes configured on multiple uplink cells.

A NACKed HARQ process can be either due to failed decoding of a received autonomous transmission from UE 12 or due to the eNB 12 totally missing the autonomous transmission from UE 12. UE 12 might not get any additional information beside the ACK/NACK bit; therefore, UE 12 can decide on doing either adaptive or non-adaptive retransmission for the NACKed HARQ processes.

This HARQ feedback can be sent based on:
One format for this feedback is based on Physical Downlink Control Channel (PDCCH)/enhanced PDCCH (EPDCCH). This PDCCH/EPDCCH may be addressed to a Cell Radio Network Temporary Identifier (C-RNTI), or a Temporary C-RNTI (TC-RNTI) or another temporary UE identifier if it is in response to a msg3 (i.e., a Radio Resource Control (RRC) connection request message) transmission during initial access.
Another format for this is a new PHY channel using one interlace for multiple signals (similar to the enhanced Physical Uplink Control Channel (EPUCCH)).
Another format for this is a new PHY channel using one interlace for multiple signals in the downlink partial subframe (similar to the sPUCCH).
Another format is based on Physical Downlink Shared Channel (PDSCH) which requires its own PDCCH.
Another format is based on Physical HARQ Indicator Channel (PHICH), potentially in combination with bit compression to reduce the size of the reported bitmap. The PHICH may be located in the first slot of a full downlink subframe, in the Downlink Pilot Time Slot (DwPTS) region of an ending partial downlink TTI, or the second slot of an initial partial downlink TTI.
Another format is based on implicit ACK/NACK via the Control Channel Element (CCE) indices of PDCCH transmissions sent to a UE for downlink scheduling, where the time gap between the autonomous Physical Uplink Shared Channel (PUSCH) and the PDCCH transmission is 1 millisecond (ms) or more.

In another aspect, the above feedback formats may be repeated over several TTIs in order to achieve downlink coverage enhancement.

Second Embodiment

In addition to sending the bitmap, if the eNB 14 identifies an autonomous uplink transmission but fails to decode the data:
It can request a retransmission using a dedicated legacy grant via PDCCH or EPDCCH. The retransmission PDCCH/EPDCCH can carry single or multi-subframe scheduling Downlink Control Information (DCI). The eNB adapts the DCI (Modulation and Coding Scheme (MCS), Resource Block (RB), etc.) to increase the likelihood of successful retransmission.

It can request a retransmission via PDCCH or EPDCCH but ignoring some field(s) of PDCCH/EPDCCH such as absolute retransmission time. The eNB may adapt some of the DCI but keeps it flexible for the UE to do the retransmission at point in time.

The eNB 14 can use the common PDCCH (CPDCCH) to indicate NACK. The acknowledgement can be sent based on group Identity (ID), assuming UEs 12 are divided into groups, or per UE using Radio Network Temporary Identifier (RNTI). UE 12 can then decide to do either adaptive or non-adaptive retransmission at any point in time.

A first PHICH embodiment is based on ACK/NACK bundling across time, transport blocks, and/or HARQ processes. In the case of ACK/NACK bundling across time, acknowledgements corresponding to a group of uplink TTIs are combined prior to transmission on the uplink. In this latter case, the individual uplink transport block Cyclic Redundancy Check (CRC) results are passed through a logical "AND" operation to form a single acknowledgment indicative of whether zero or more than zero blocks were received in error. This would require the UE to retransmit all the HARQ processes that were transmitted since the last PHICH feedback. The PHICH timing relation in legacy LTE between PUSCH in subframe n and the corresponding PHICH in subframe n+k is currently set to k=4 for Frequency Division Duplexing (FDD) and k=4, 6, 7 for different Time Division Duplexing (TDD) configurations. In the current embodiment, this timing relation may be a configurable value between k=1 and k=10. In another example, this timing relation may be indicated dynamically using common PDCCH signaling in the same downlink subframe as the PHICHs in question.

In another aspect related to the use of PHICH for ACK/NACK feedback, the PHICH resource assignment in legacy LTE needs to be modified. In legacy LTE the PHICH resource for a particular UE is determined based on a combination of PUSCH RB index assignment and Demodulation Reference Signal (DMRS) parameters. For interlaced uplink transmissions in unlicensed spectrum where the PHICHs in subframe n are used to send HARQ ACK/NACKs for a single preceding uplink subframe, the parameters ($n_{PHICH}^{group}$, $n_{PHICH}^{seq}$) where $n_{PHICH}^{group}$ is the PHICH group number and $0 \leq n_{PHICH}^{seq} \leq 7$ is the orthogonal sequence index within the group, may be determined as:

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB_{RA}}/N_{PHICH}^{group} \rfloor + n_{DMRS}) \bmod 2N_{SF}^{PHICH}$$

where $n_{DMRS}$ is mapped from the cyclic shift for DMRS field (according to Table 9.1.2-2 of 3GPP Technical Specification (TS) 36.213) in the semi-persistent grant, or most recent PDCCH/EPDCCH with uplink DCI format for the transport block(s) associated with the corresponding PUSCH transmission. $n_{DMRS}$ shall be set to zero, if there is no PDCCH/EPDCCH with uplink DCI format for the same transport block; and if the initial PUSCH for the same transport block is scheduled by the random access response grant.

$N_{SF}^{PHICH}$ is the spreading factor size used for PHICH modulation.

$$I_{PRB\_RA} = \begin{cases} I_{Interlace\_RA}^{lowest\_index} & \begin{array}{l}\text{for the first TB of a } PUSCH \text{ with} \\ \text{associated } PDCCH/EPDCCH \text{ or for the} \\ \text{case of no associated } PDCCH/EPDCCH \\ \text{when the number of negatively} \\ \text{acknowledged TBs is not equal to the} \\ \text{number of TBs indicated in the most recent} \\ PDCCH/EPDCCH \text{ associated with the} \\ \text{corresponding } PUSCH\end{array} \\ I_{Interlace\_RA}^{lowest\_index} + 1 & \begin{array}{l}\text{for a second TB of a } PUSCH \text{ with} \\ \text{associated } PDCCH/EPDCCH\end{array} \end{cases}$$

where $I_{Interlace\_RA}^{lowest\_index}$ is the lowest uplink interlace index in the first slot of the corresponding PUSCH transmission. The uplink interlace indices may be configured semi-statically or via Semi-Persistent Scheduling (SPS) grant per UE, or indicated using a common DCI.

$N_{PHICH}^{group}$ is the number of PHICH groups configured by higher layers via Master Information Block (MIB) or System Information Block (SIB), in legacy frame structure type 1 and type 3, the number of PHICH groups $N_{PHICH}^{group}$ is constant in all subframes and given by:

$$N_{PHICH}^{group} = \begin{cases} \left\lceil N_g \left(\frac{N_{RB}^{DL}}{8}\right) \right\rceil & \text{for normal cyclic prefix} \\ 2 \cdot \left\lceil N_g \left(\frac{N_{RB}^{DL}}{8}\right) \right\rceil & \text{for extended cyclic prefix} \end{cases}$$

$I_{PHICH}$=0 or 1 depending upon restrictions on the downlink-uplink subframe allocation per transmit opportunity (TXOP).

Figure 10:
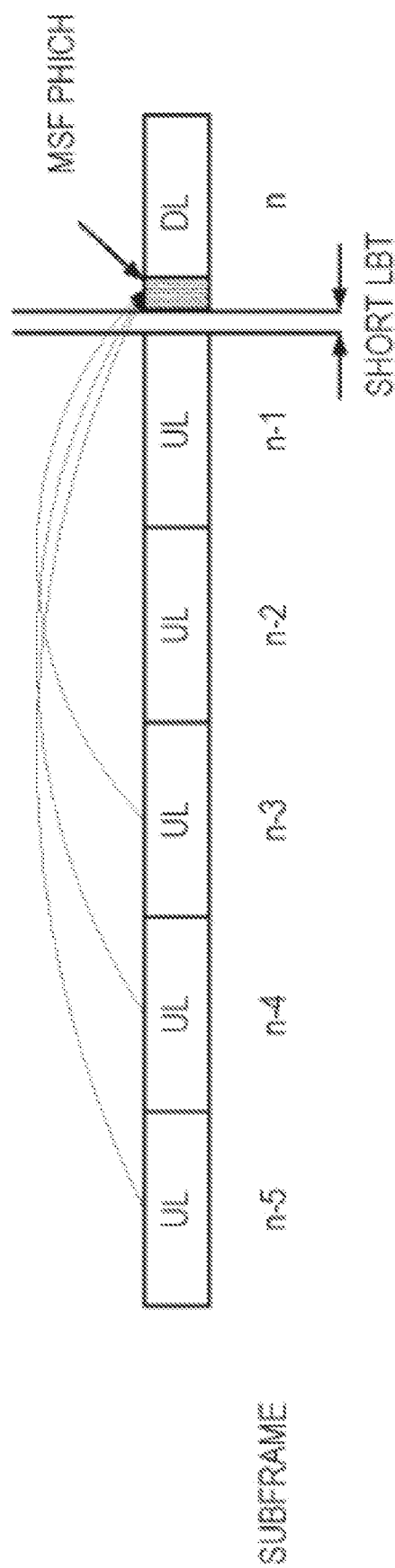
FIG. 10 illustrates a Multi-Subframe (MSF) Physical Hybrid Automatic Repeat Request (HARQ) Indicator Channel (PHICH) HARQ Acknowledgement/Negative Acknowledgement (ACK/NACK) according to some embodiments of the disclosed subject matter.

In another aspect of the PHICH embodiment, the PHICHs in subframe n are used to indicate HARQ ACK/NACKs for autonomous uplink transmissions in multiple preceding subframes n-k, n-k-1, n-k-2, etc. A non-limiting example with k=2 is shown in FIG. 10, where three uplink subframes with autonomous PUSCH transmissions have their corresponding Multi-Subframe (MSF) PHICHs sent in subframe n.

For the MSF PHICH case, a mapping between uplink subframe index and PHICH resource assignment needs to be defined if individual PHICHs are used for each preceding uplink subframe. This can be achieved by sending an uplink HARQ ACK bitmap of size K using K PHICHs for a given UE, where K is no larger than the number of uplink HARQ processes configured for said UE. The frequency index of the first PHICH may be obtained using the lowest uplink interlace index and uplink DMRS cyclic shift as before, while the subsequent K−1 PHICHs are mapped to the subsequent PHICH groups in a sequential manner. For example, with parameter Ng=2 and a downlink system bandwidth of 100 RBs, 25 PHICH groups with a total of 200 PHICHs are available, which implies that up to floor(200/K) bitmaps can be sent for floor(200/K) UEs per downlink subframe.

With the above rule, if for example UE 1 transmits on a particular interlace in subframes n-6 and n-5, and UE 2 transmits on the same interlace with the same uplink DMRS cyclic shift in subframes n-4 and n-3, then both UEs will look for their PHICHs in the same overlapping locations. The eNB can avoid this by allocating separate interlace and DMRS parameters for UEs in autonomous uplink mode.

Alternatively, as discussed previously in this section, the MSF PHICH may be constructed using time bundling across uplink subframes, such that a single PHICH indicates ACK or NACK for a set of uplink subframes. In this case, the PHICH assignment and reception procedures reduce to the previous embodiments.

Third Embodiment

The UE can exploit the benefits of shared Maximum Channel Occupancy Time (MCOT) concept to give a chance for the downlink transmission to occur immediately after the uplink transmission, within the same MCOT and using a fast LBT (for instance only 25 microseconds (μs)). Nevertheless, the UE needs to indicate to the eNB the remaining duration of the MCOT and explicitly request HARQ feedback. This indication can be sent either, as non-limiting examples, on PUCCH or PUSCH.

Figure 11:
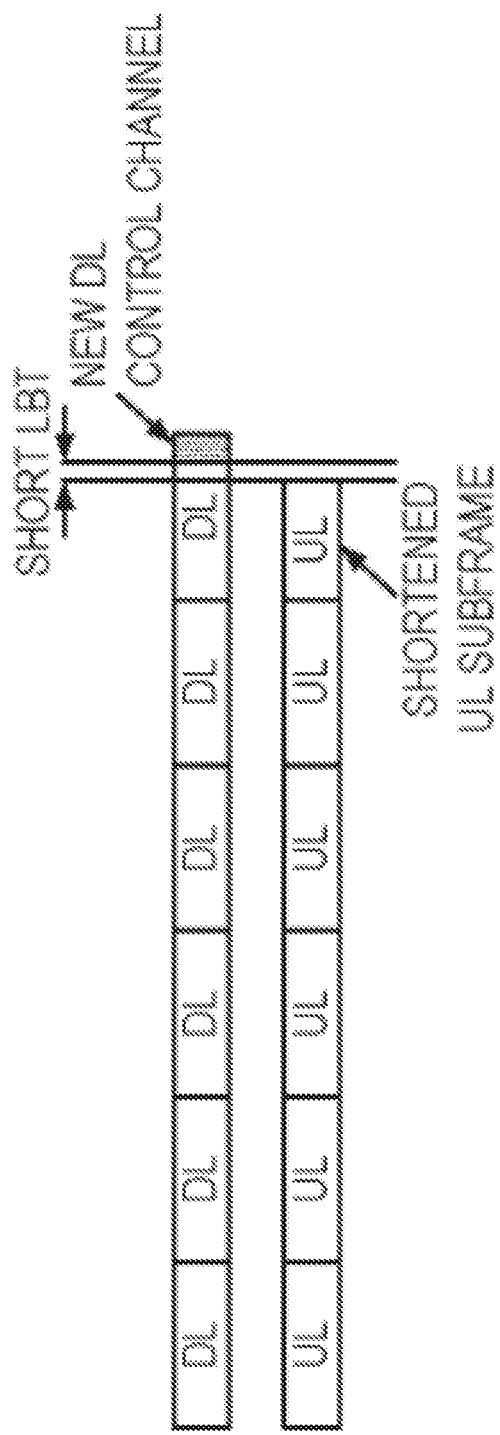
FIG. 11 illustrates a new downlink control transmission region based on shorted uplink subframes according to some embodiments of the disclosed subject matter.
Figure 12:
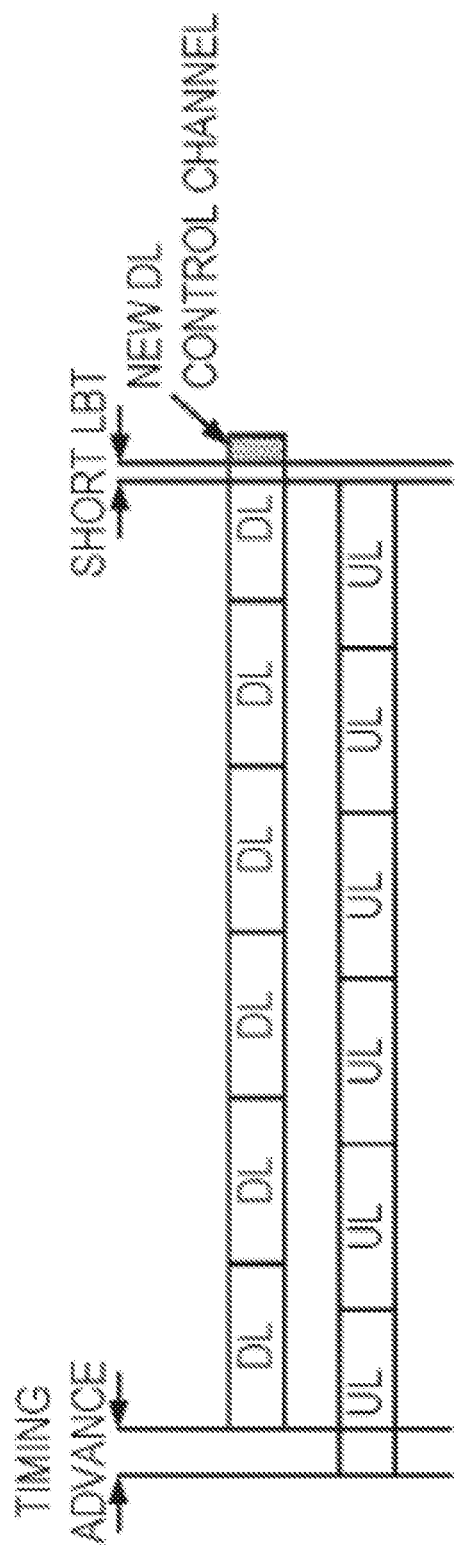
FIG. 12 illustrates a new downlink control transmission region based on timing advance of the uplink transmissions.

The downlink transmission can start at the earliest subframe boundary after a successful fast LBT (or no LBT at all).
  As another embodiment, similar to the sPUCCH concept, a new downlink control channel can be created for the purpose of sending HARQ feedback for uplink transmission.
    The UE transmission includes a partial uplink TTI and the available downlink HARQ feedback will follow immediately during the remainder of the said subframe. This is illustrated in FIG. 11.
    A second approach is to use large timing advance for the uplink transmission such that the new downlink control channel can be transmitted before the next downlink subframe. This is illustrated in FIG. 12.
    The new downlink control channel region can be enabled by a combination of the shortened uplink subframe and timing advance configuration of the uplink transmissions.

Fourth Embodiment

The eNB multiplexes the pending HARQ feedback for uplink transmission with any planned downlink transmissions to minimize the channel utilization.
  Multiplexed in PDCCH/C-PDCCH/EPDCCH
  Multiplexed in C-PDCCH in the Discovery Reference Signal (DRS) frames
  The eNB can also trigger a downlink transmission to transmit the HARQ feedback on (PDCCH/EPDCCH/C-PDCCH or other) if it has a HARQ feedback that is pending for longer than "X" duration. As a non-limiting example, this duration can be in terms of "ms" or "TTIs."

Fifth Embodiment

UE 12 can request the eNB 14 to send HARQ feedback via either Uplink Control Information (UCI) on PUSCH/sPUCCH/EPUCCH. The requested feedback may correspond to one or more uplink carriers.

The third embodiment described above is a non-limiting example on when such a request can be used by UE 12 to indicate for the eNB 14 that it is expecting the HARQ feedback from the eNB 14 within the same MCOT.

Sixth Embodiment

As an alternative to the bitmap, UE 12 can assume that all transmitted uplink HARQ processes were unsuccessful unless it receives an ACK from the eNB 14. The ACK can be sent back on PDCCH/EPDCCH/C-PDCCH or a new PHY channel UE 12 uses a timer/counter that determines the subframes since the initial transmission of a process and retransmits the process when the timer/counter exceeds a configured threshold.

Seventh Embodiment

For autonomous transmission, UE 12 can perform asynchronous HARQ (re)transmission. In this case, UE 12 specifies the HARQ process ID in the autonomous (re) transmission. As non-limiting examples, the HARQ ID can be provided on PUSCH or PUCCH.

Example Embodiments of a Wireless Device and Network Node

Figure 13:
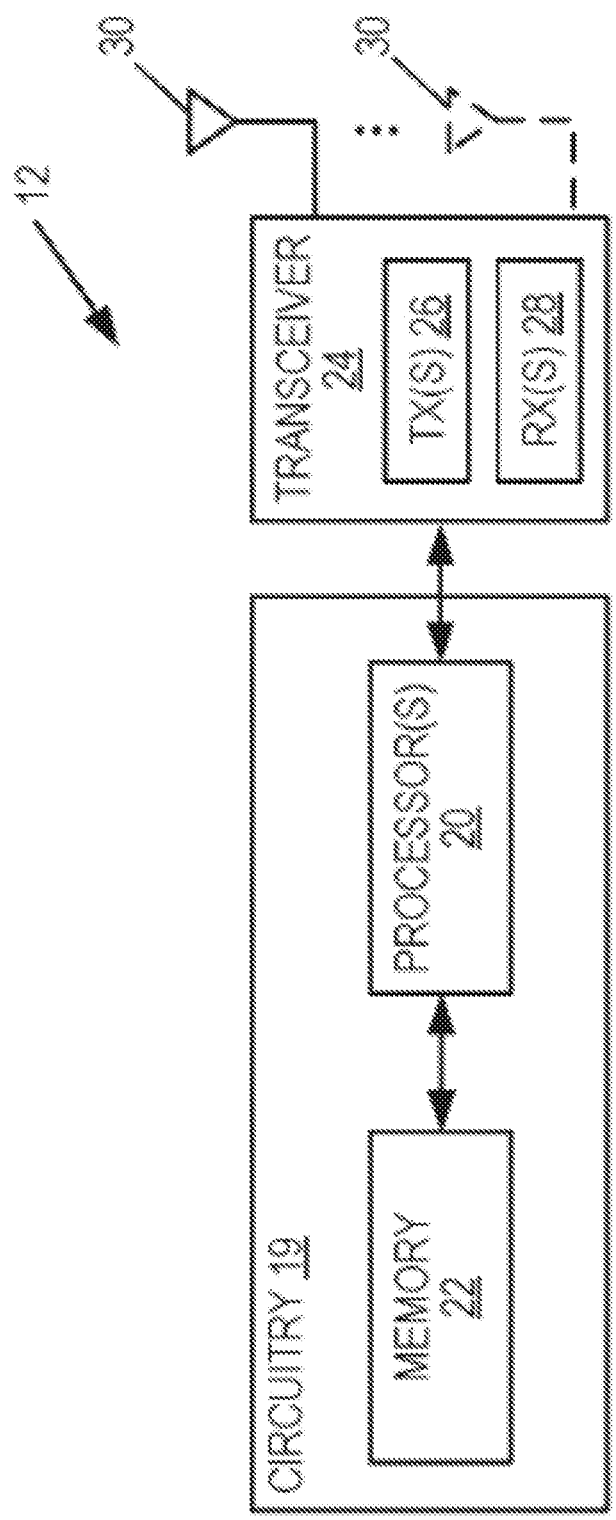
FIG. 13 illustrates an example embodiment of a wireless device (e.g., a UE).

FIG. 13 is a schematic block diagram of the wireless device 12 (e.g., a UE) according to some embodiments of the disclosed subject matter. As illustrated, the wireless device 14 includes circuitry 19 comprising one or more processors 20 (e.g., Central Processing Units (CPUs), Application Specific Integrated Circuits (ASICs), Field Programmable Gate Arrays (FPGAs), and/or the like) and memory 22. The wireless device 12 also includes one or more transceivers 24 each including one or more transmitter 26 and one or more receivers 28 coupled to one or more antennas 30. In some embodiments, the functionality of the wireless device 12 described above may be fully or partially implemented in software that is, e.g., stored in the memory 22 and executed by the processor(s) 20.

In some embodiments, a computer program including instructions which, when executed by at least one processor, causes the at least one processor to carry out the functionality of the wireless device 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 14:
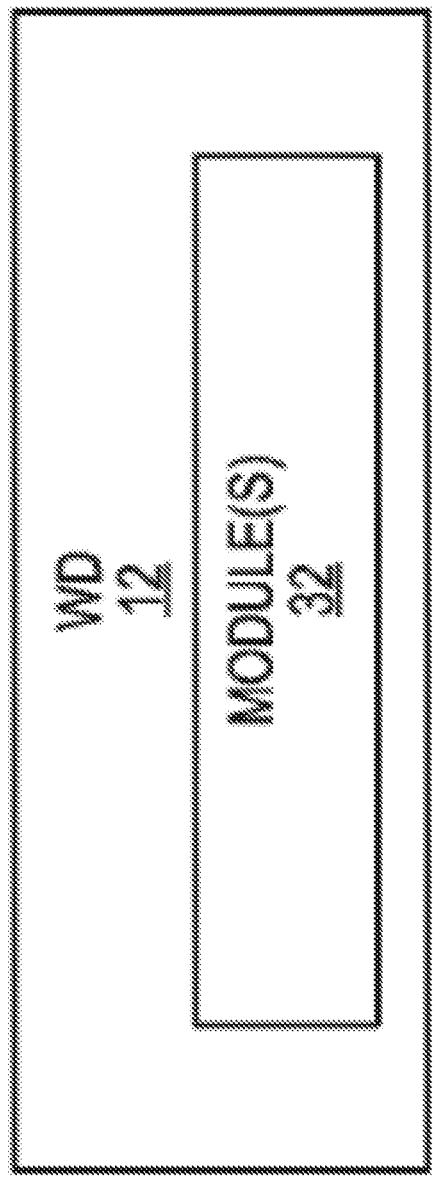
FIG. 14 illustrates another example embodiment of a wireless device (e.g., a UE).

FIG. 14 is a schematic block diagram of the wireless device 12 according to some other embodiments of the disclosed subject matter. The wireless device 12 includes one or more modules 32, each of which is implemented in software. The module(s) 32 provide the functionality of the wireless device 12 (e.g., UE) described herein.

Figure 15:
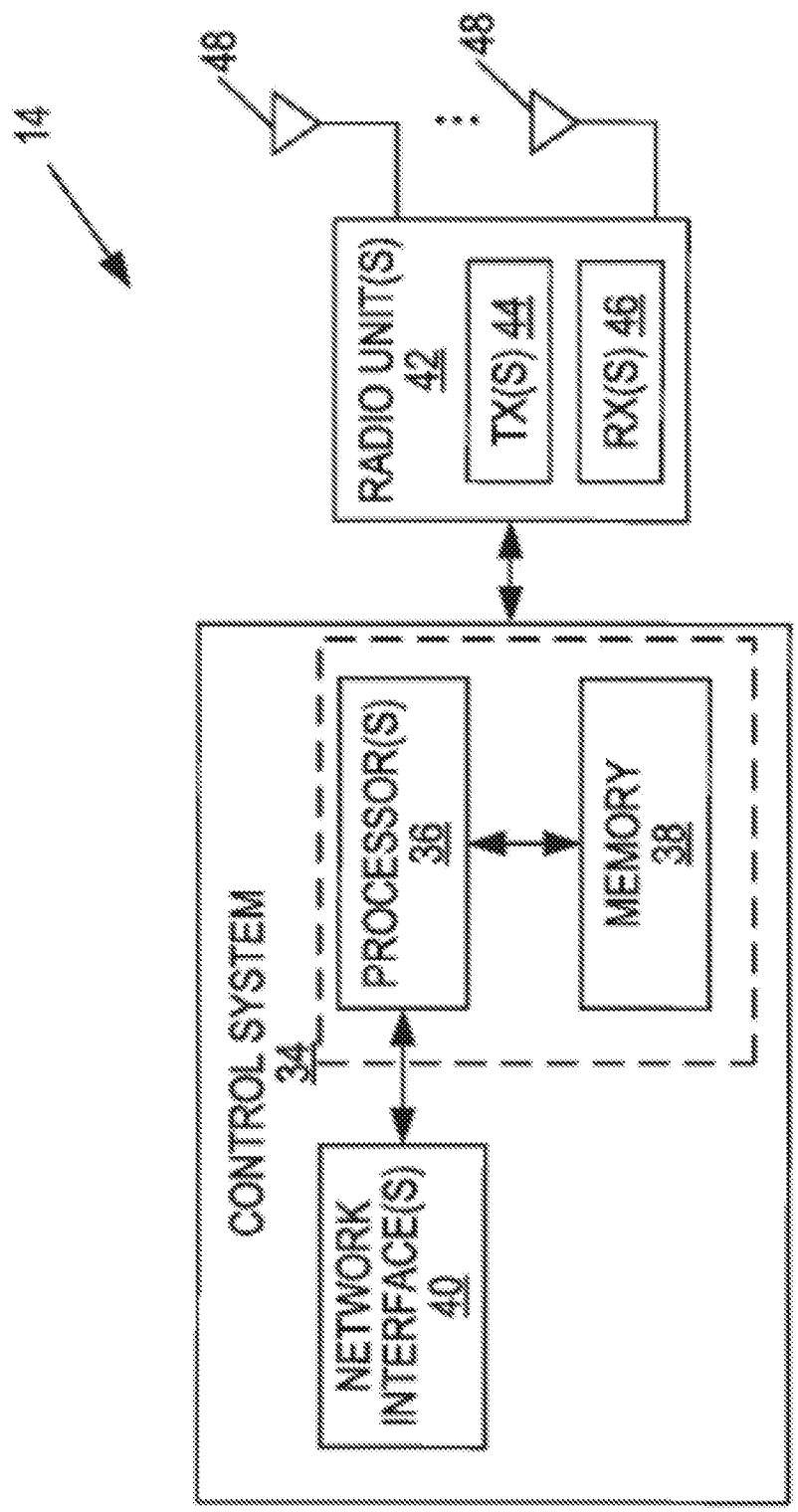
FIG. 15 illustrates an example embodiment of a network node and, in particular, a radio access node (e.g., a base station).
Figure 10:
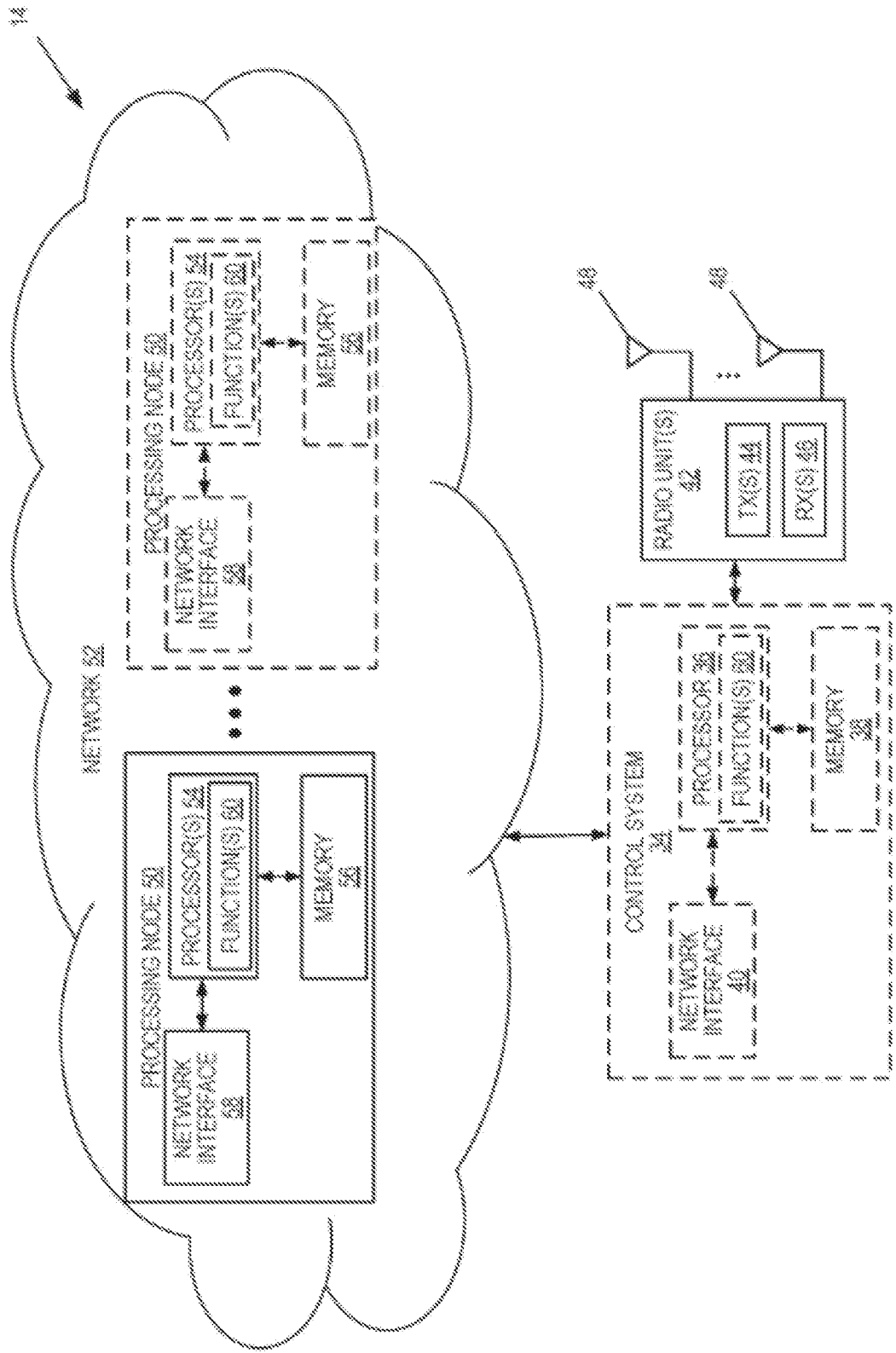

FIG. 15 is a schematic block diagram of the radio access node 14 (e.g., base station 14 or eNB 14) according to some embodiments of the disclosed subject matter. Other types of network nodes may have similar architectures (particularly with respect to including processor(s), memory, and a network interface). As illustrated, the radio access node 14 includes a control system 34 that includes circuitry comprising one or more processors 36 (e.g., CPUs, ASICs, FPGAs, and/or the like) and memory 38. The control system 34 also includes a network interface 40. The radio access node 14 also includes one or more radio units 42 that each includes one or more transmitters 44 and one or more receivers 46 coupled to one or more antennas 48. In some embodiments, the functionality of the radio access node 14 described above may be fully or partially implemented in software that is, e.g., stored in the memory 38 and executed by the processor(s) 36.

FIG. 16 is a schematic block diagram that illustrates a virtualized embodiment of the radio access node 14 according to some embodiments of the disclosed subject matter. Other types of network nodes may have similar architectures (particularly with respect to including processor(s), memory, and a network interface).

As used herein, a "virtualized" radio access node 14 is a radio access node 14 in which at least a portion of the functionality of the radio access node 14 is implemented as a virtual component (e.g., via a virtual machine(s) executing on a physical processing node(s) in a network(s)). As illustrated, the radio access node 14 optionally includes the control system 34 as described with respect to FIG. 15. The radio access node 14 also includes the one or more radio units 42 that each includes the one or more transmitters 44 and the one or more receivers 46 coupled to the one or more antennas 48, as described above. The control system 34 is connected to the radio unit(s) 42 via, for example, an optical cable or the like. The control system 34 is connected to one or more processing nodes 50 coupled to or included as part of a network(s) 52 via the network interface 40. Alternatively, if the control system 34 is not present, the one or more radio units 42 are connected to the one or more processing nodes 50 via a network interface(s). Each processing node 50 includes one or more processors 54 (e.g., CPUs, ASICs, FPGAs, and/or the like), memory 56, and a network interface 58.

In this example, functions 60 of the radio access node 14 described herein are implemented at the one or more processing nodes 50 or distributed across the control system 34 (if present) and the one or more processing nodes 50 in any desired manner. In some particular embodiments, some or all of the functions 60 of the radio access node 14 described herein are implemented as virtual components executed by one or more virtual machines implemented in a virtual environment(s) hosted by the processing node(s) 50. As will be appreciated by one of ordinary skill in the art, additional signaling or communication between the processing node(s) 50 and the control system 34 (if present) or alternatively the radio unit(s) 42 is used in order to carry out at least some of the desired functions. Notably, in some embodiments, the control system 34 may not be included, in which case the radio unit(s) 42 communicate directly with the processing node(s) 50 via an appropriate network interface(s).

In some embodiments, a computer program including instructions which, when executed by at least one processor, causes the at least one processor to carry out the functionality of the radio access node 14 or a processing node 50 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 17:
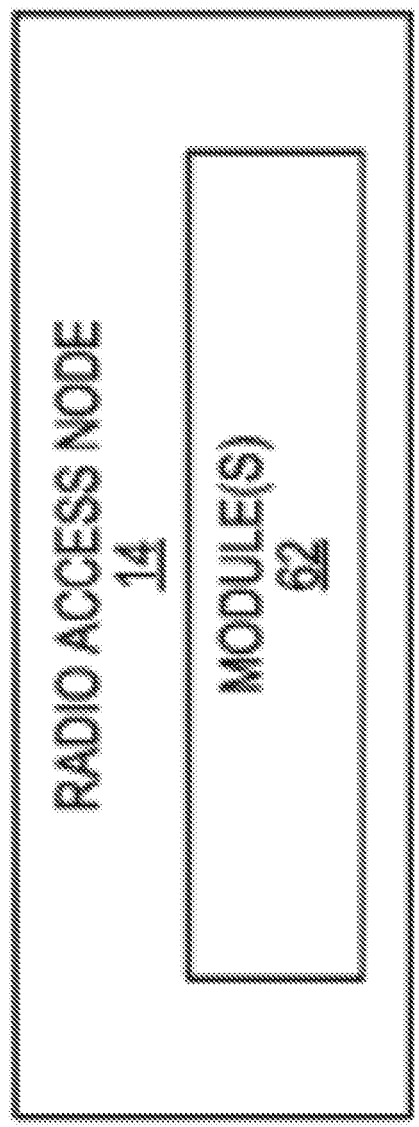
FIG. 17 illustrates another example embodiment of a network node and, in particular, a radio access node (e.g., a base station).

FIG. 17 is a schematic block diagram of the radio access node 14 according to some other embodiments of the disclosed subject matter. The radio access node 14 includes one or more modules 62, each of which is implemented in software. The module(s) 62 provide the functionality of the radio access node 14 described herein.

Figure 18:
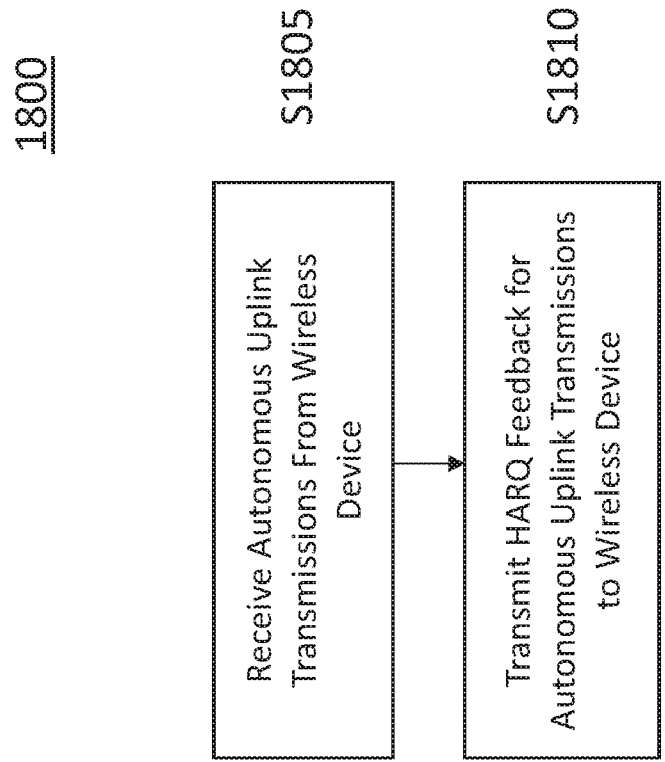
FIG. 18 illustrates an example embodiment of a method in a network node.

FIG. 18 illustrates an example embodiment of a method in a network node.

Referring to FIG. 18, the method comprises receiving a plurality of autonomous uplink transmissions from a wireless device (12) in the unlicensed spectrum (S1805), and transmitting HARQ feedback for the plurality of autonomous uplink transmissions to the wireless device (12), the HARQ feedback comprising a bit map of some or all HARQ processes configured for at least one cell (16) and a corresponding bit acknowledgement mapped to each HARQ process (S1810).

Figure 19:
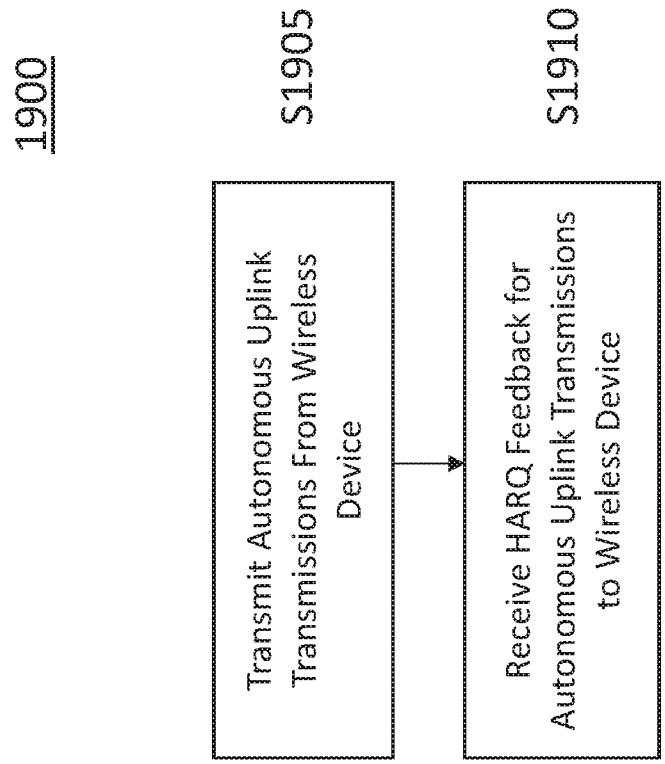
FIG. 19 illustrates an example embodiment of a method in a wireless device.

FIG. 19 illustrates an example embodiment of a method in a wireless device.

Referring to FIG. 19, the method comprises performing autonomous uplink transmissions in the unlicensed spectrum for one or more HARQ processes, and receiving HARQ feedback from a network node (14), the HARQ feedback comprising a bit map of some or all HARQ processes configured for at least one respective cell (16) and a corresponding bit acknowledgement mapped to each HARQ process.

The following acronyms, among others, may be used throughout this disclosure.

μs Microsecond
3GPP Third Generation Partnership Project
5G Fifth Generation
ACK Acknowledgement
ASIC Application Specific Integrated Circuit
BSR Buffer Status Report
CA Carrier Aggregation
CCA Clear Channel Assessment
CCE Control Channel Element
CE Control Element
CFI Control Format Indicator
CN Core Network
CPDCCH common PDCCH
CPU Central Processing Unit
CRC Cyclic Redundancy Check
C-RNTI Cell Radio Network Temporary Identifier
CRS Cell Specific Reference Symbol
CSMA/CA Carrier Sense Multiple Access with Collision Avoidance
CW Contention Window
dBi Decibel Isotropic
dBm Decibel-Milliwatt
DCI Downlink Control Information
DFT Discrete Fourier Transform
DIFS Distributed Inter-Frame Space
DMRS Demodulation Reference Signal
DRS Discovery Reference Signal
DwPTS Downlink Pilot Time Slot
EIRP Equivalent Isotropically Radiated Power
eMTC Enhanced Machine Type Communication
eNB Enhanced or Evolved Node B
EPDCCH Enhanced Physical Downlink Control Channel
EPUCCH Enhanced Physical Uplink Control Channel
FDD Frequency Division Duplexing
FPGA Field Programmable Gate Array
GHz Gigahertz
HARQ Hybrid Automatic Repeat Request
ID Identity
LAA License Assisted Access
LBT Listen-Before-Talk
LTE Long Term Evolution
LTE-U Long Term Evolution in Unlicensed Spectrum
MAC Medium Access Control
MCOT Maximum Channel Occupancy Time
MCS Modulation and Coding Scheme
MF MulteFire
MHz Megahertz
MIB Master Information Block MME Mobility Management Entity
ms Millisecond
MSF Multi-Subframe
MTC Machine Type Communication
NACK Negative Acknowledgement
NDI New Data Indicator
OFDM Orthogonal Frequency Division Multiplexing
PCell Primary Cell
PDCCH Physical Downlink Control Channel
PDN Packet Data Network
PDSCH Physical Downlink Shared Channel
P-GW Packet Data Network Gateway
PHICH Physical Hybrid Automatic Repeat Request Indicator Channel
PUCCH Physical Uplink Control Channel
PUSCH Physical Uplink Shared Channel
RB Resource Block
Rel Release
RNTI Radio Network Temporary Identifier
RRC Radio Resource Control
RTT Round Trip Time
RV Redundancy Version
SCEF Service Capability Exposure Function
SCell Secondary Cell
SC-FDMA Single-Carrier Frequency Division Multiple Access
SIB System Information Block
SPS Semi-Persistent Scheduling
SR Scheduling Request
SRS Sounding Reference Signal
TC-RNTI Temporary Cell Radio Network Temporary Identifier
TDD Time Division Duplexing
TDMA Time Division Multiple Access
TS Technical Specification
TTI Transmit Time Interval
UCI Uplink Control Information
UE User Equipment
WLAN Wireless Local Area Network Those skilled in the art will recognize improvements and modifications to the embodiments of the disclosed subject matter. All such improvements and modifications are considered within the scope of the concepts disclosed herein.

The invention claimed is:

1. A method of operation of a network node in a cellular communications network to provide Hybrid Automatic Repeat Request (HARQ) feedback for autonomous uplink transmissions in an unlicensed spectrum, comprising:
   receiving a plurality of autonomous uplink transmissions from a wireless device in the unlicensed spectrum; and
   transmitting HARQ feedback for the plurality of autonomous uplink transmissions to the wireless device, the HARQ feedback comprising a bitmap of some or all HARQ processes configured for at least one cell and a corresponding bit acknowledgement mapped to each configured HARQ process, the HARQ feedback further comprising an association between an index in the bitmap and a HARQ process ID of each HARQ process,
   wherein the transmitting HARQ feedback is performed using a shared maximum channel occupancy time scheme in which a portion of a maximum channel occupancy time for an uplink transmission from the wireless device is used for transmission by the network node.

2. The method of claim 1, further comprising:
   determining that the network node has failed to decode data of one or more autonomous uplink transmissions from the wireless device; and
   in response to the determination, requesting retransmission of the data via downlink control information (DCI).

3. The method of claim 1, further comprising:
   receiving an indication of a remaining duration of a maximum channel occupancy time (MCOT) from the wireless device; and
   in response to receiving the indication, transmitting information to the wireless device during the remaining duration.

4. The method of claim 1 wherein transmitting the HARQ feedback comprises transmitting the HARQ feedback using a format selected from a group consisting of:
   a format comprising a physical layer channel using one interlace for multiple signals;
   a format comprising a physical layer channel using one interlace for multiple signals in a downlink partial subframe;
   a format based on Physical HARQ Indicator Channel (PHICH);
   a format based on PHICH in combination with bit compression to reduce a size of the bitmap; and
   a format based on an implicit ACK/NACK via Control Channel Element (CCE) indices of PDCCH transmissions sent to wireless devices for downlink scheduling where a time gap between an autonomous uplink transmission and a PDCCH transmission is 1 ms or more.

5. The method of claim 1 wherein, for each HARQ process of the some or all HARQ processes, the corresponding bit acknowledgement indicates a NACK if the network node missed an autonomous uplink transmission from the wireless device on the HARQ process, or the network node failed to successfully decode an autonomous uplink transmission from the wireless device on the HARQ process.

6. The method of claim 1, further comprising, if the network node identifies an autonomous uplink transmission from the wireless device and fails to successfully decode the identified autonomous uplink transmission, performing at least one of:
   transmitting a request for retransmission using a dedicated uplink grant via PDCCH OR EPDCCH;
   transmitting a NACK via common PDCCH (CPDCCH); and
   transmitting a NACK via PHICH.

7. The method of claim 6 further comprising transmitting the HARQ feedback starting at an earliest subframe boundary within the shared maximum channel occupancy time after completion of the uplink transmission and performing a fast Listen Before Talk (LBT) procedure.

8. The method of claim 6 wherein the shared maximum channel occupancy time scheme utilizes: a shortened uplink transmission time interval (TTI) within a subframe to enable transmission of the HARQ feedback in a remainder of the subframe: or a timing advance for the uplink transmission such that a downlink channel in which the HARQ feedback is transmitted before a start of a next downlink subframe after completion of the uplink transmission.

9. The method of claim 1 wherein transmitting the HARQ feedback comprises multiplexing the HARQ feedback with a planned downlink transmission.

10. The method of claim 1 wherein transmitting the HARQ feedback comprises triggering a downlink transmission to transmit the HARQ feedback if a HARQ feedback has been pending for at least a predefined or preconfigured threshold amount of time.

11. A network node for a cellular communications network enabled to provide HARQ feedback for autonomous uplink transmissions in an unlicensed spectrum, comprising:
at least one processor, memory and transceiver collectively configured to:
receive a plurality of autonomous uplink transmissions from a wireless device in the unlicensed spectrum, wherein an autonomous uplink transmission is an uplink transmission performed by the wireless device without an uplink grant and on a channel determined to be clear; and
transmit HARQ feedback for the plurality of autonomous uplink transmissions to the wireless device, the HARQ feedback comprising a bitmap of some or all HARQ processes configured for at least one cell and a corresponding bit acknowledgement mapped to each HARQ process,
wherein the transmitting HARQ feedback is performed using a shared maximum channel occupancy time scheme in which a portion of a maximum channel occupancy time for an uplink transmission from the wireless device is used for transmission by the network node.

12. A method of operation of a wireless device in a cellular communications network enabled to transmit autonomous uplink transmissions in an unlicensed spectrum, comprising:
performing autonomous uplink transmissions in the unlicensed spectrum for one or more HARQ processes; and
receiving HARQ feedback from a network node, the HARQ feedback comprising a bitmap of some or all HARQ processes configured for at least one cell and a corresponding bit acknowledgement mapped to each configured HARQ process;
using a timer to determine a number of subframes since an initial transmission of the predetermined autonomous uplink transmission; and
performing the retransmission in response to the timer exceeding a configured threshold.

13. The method of claim 12, further comprising:
in response to determining that no HARQ feedback for a predetermined autonomous uplink transmission is received from the network node within a predetermined time period, retransmitting the predetermined autonomous uplink transmission.

14. The method of claim 12, further comprising:
determining a remaining duration of a maximum channel occupancy time (MCOT) of the wireless device;
transmitting an indication of a remaining duration of the MCOT to the network node; and
receiving information from the network node during the remaining duration.

15. The method of claim 12 wherein receiving the HARQ feedback comprises receiving the HARQ feedback via physical downlink control channel (PDCCH) or extended PDCCH (EPDCCH).

16. The method of claim 12, further comprising:
transmitting an autonomous uplink transmission to the network node; and
receiving, from the network node via downlink control information (DCI), a request for retransmission of the autonomous uplink transmission.

17. The method of claim 12 wherein, for each HARQ process of the some or all HARQ processes, the corresponding bit acknowledgement indicates a NACK if the network node missed an autonomous uplink transmission from the wireless device on the HARQ process, or the network node failed to successfully decode an autonomous uplink transmission from the wireless device on the HARQ process.

18. The method of claim 12, further comprising receiving the HARQ feedback using a shared maximum channel occupancy time scheme in which a portion of a maximum channel occupancy time for an uplink transmission from the wireless device(Original) is used for transmission by the network node.

19. The method of claim 18, further comprising receiving the HARQ feedback starting at an earliest subframe boundary within a shared maximum channel occupancy time after completion of the uplink transmission.

20. The method of claim 18 wherein the shared maximum channel occupancy time scheme utilizes a shortened uplink transmission time interval (TTI) within a subframe to enable transmission of the HARQ feedback in a remainder of the subframe.

21. The method of claim 18 wherein the shared maximum channel occupancy time scheme utilizes a timing advance for the uplink transmission such that a downlink channel in which the HARQ feedback is received before a start of a next downlink subframe after completion of the uplink transmission.

22. The method of claim 12 wherein transmitting the HARQ feedback comprises multiplexing the HARQ feedback with a planned downlink transmission.

23. A wireless device for a cellular communications network enabled to transmit autonomous uplink transmissions in an unlicensed spectrum, comprising:
at least one processor, memory and transceiver collectively configured to:
perform autonomous uplink transmissions in the unlicensed spectrum for one or more HARQ processes, wherein an autonomous uplink transmission is an uplink transmission performed by the wireless device without an uplink grant and on a channel determined to be clear; and
receive HARQ feedback from a network node, the HARQ feedback comprising a bitmap of some or all HARQ processes configured for at least one cell and a corresponding bit acknowledgement mapped to each HARQ process.

* * * * *